US009622119B2

(12) United States Patent
Wu et al.

(10) Patent No.: US 9,622,119 B2
(45) Date of Patent: Apr. 11, 2017

(54) METHOD AND APPARATUS FOR DISPLAYING NETWORK NAME

(71) Applicant: HUAWEI TECHNOLOGIES CO., LTD., Shenzhen (CN)

(72) Inventors: Xiaobo Wu, Shanghai (CN); Lin Shu, Shanghai (CN); Wanqiang Zhang, Beijing (CN); Hai Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 236 days.

(21) Appl. No.: 14/625,261

(22) Filed: Feb. 18, 2015

(65) Prior Publication Data

US 2015/0163703 A1 Jun. 11, 2015

Related U.S. Application Data

(63) Continuation of application No. PCT/CN2012/080367, filed on Aug. 20, 2012.

(51) Int. Cl.
*H04W 36/00* (2009.01)
*H04W 60/00* (2009.01)
(Continued)

(52) U.S. Cl.
CPC ....... *H04W 36/0022* (2013.01); *H04W 48/08* (2013.01); *H04W 60/00* (2013.01); *H04W 8/02* (2013.01)

(58) Field of Classification Search
None
See application file for complete search history.

(56) References Cited

U.S. PATENT DOCUMENTS

2011/0021216 A1* 1/2011 Pudney .................. H04W 4/12
455/466
2011/0032902 A1 2/2011 Kim
(Continued)

FOREIGN PATENT DOCUMENTS

| CN | 1756423 | 4/2006 |
| CN | 1889789 | 1/2007 |

(Continued)

OTHER PUBLICATIONS

Japanese Office Action dated Feb. 9, 2016 in corresponding Japanese Patent Application No. 2015-527747.
(Continued)

*Primary Examiner* — Joseph Bednash
(74) *Attorney, Agent, or Firm* — Staas & Halsey LLP

(57) ABSTRACT

A method and an apparatus for displaying a network name are provided. A first mobility management device in a first network acquires first network name information, where the first network name information is a network name currently displayed on a user equipment UE, and/or a public land mobile network identity PLMN ID corresponding to the network name that is currently displayed on the UE, and the first network is a network with which the UE currently registers or a network of two networks with which the UE currently jointly register. If the UE switches over to a second network during a process of executing a service, the first mobility management device sends the first network name information to a second mobility management device in the second network, so that the second mobility management device sends, to the UE for displaying, a network name corresponding to the first network name information.

10 Claims, 5 Drawing Sheets

(51) Int. Cl.
*H04W 48/08* (2009.01)
*H04W 8/02* (2009.01)

(56) References Cited

U.S. PATENT DOCUMENTS

2012/0100892 A1* 4/2012 Arzelier .................. G06F 3/14
455/566
2013/0203472 A1 8/2013 Arzelier et al.

FOREIGN PATENT DOCUMENTS

| CN | 101997951 | 3/2011 |
|---|---|---|
| EP | 2048891 A1 | 4/2009 |
| EP | 2 285 162 A2 | 2/2011 |
| JP | 2009-296098 | 12/2009 |
| JP | 2013-544043 | 12/2013 |

OTHER PUBLICATIONS

Change Request for article entitled "Asynchronous display of network name in CSFB deployment," 3GPP TSG CT WG1 Meeting # 74, Oct. 2011.
Extended European Search Report mailed Jul. 16, 2015 for corresponding European Patent Application No. 12883180.7.
PCT International Search Report dated May 30, 2013 in corresponding International Patent Application No. PCT/CN2012/080367.
Huawei, HiSilicon, "Network Name Display in CSFB Deployment", 3GPP TSG CT WG1 Meeting #74, Hyderabad (India), Oct. 2011, 4 pp.
Huawei, HiSilicon, "Asynchronous display of network name in CSFB deployment", 3GPP TSG CT WG1 Meeting #73, St Julians, Malta, Aug. 2011, 3 pp.
"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.2.0, Jun. 2012, pp. 1-285.
"3$^{rd}$ Generation Partnership Project; Technical Specification Group Services and System Aspects; Circuit Switched (CS) fallback in Evolved Packet System (EPS); Stage 2 (Release 11)", 3GPP TS 23.272 V.11.1.0, Jun. 2012, pp. 1-90.
"3$^{rd}$ Generation Partnership Project; Technical Specification Group Services and System Aspects; Network Sharing; Architecture and functional description (Release 11)", 3GPP TS 23.251 V11.2.0, Jun. 2012, pp. 1-29.
"3$^{rd}$ Generation Partnership Project; Technical Specification Group Services and System Aspects; Intra-domain connection of Radio Access Network (RAN) nodes to multiple Core Network (CN) nodes (Release 10)", 3GPP TS 23.236 V10.3.0, Mar. 2012, pp. 1-39.
"3$^{rd}$ Generation Partnership Project; Technical Specification Group Services and System Aspects; General Packet Radio Service (GPRS); Service description; Stage 2 (Release 11)", 3GPP TS 23.060 V11.2.0, Jun. 2012, pp. 1-335.
International Search Report mailed May 30, 2013 in corresponding international application PCT/CN2012/080367.
Office Action, dated Nov. 28, 2016, in Chinese Application No. 201280050335.3 (10 pp.).

* cited by examiner

METHOD AND APPARATUS FOR DISPLAYING NETWORK NAME

CROSS-REFERENCE TO RELATED APPLICATIONS

This application is a continuation of International Patent Application No. PCT/CN2012/080367, filed on Aug. 20, 2012, which is hereby incorporated by reference in its entirety.

TECHNICAL FIELD

The present invention relates to the wireless communications field, and in particular, to a method and an apparatus for displaying a network name.

BACKGROUND

The 3rd Generation Partnership Project (3GPP) has launched, based on existing 2nd generation (2G) mobile communications and 3rd generation (3G) mobile communications networks, an evolved packet system (EPS). An EPS network includes an evolved universal mobile telecommunications system territorial radio access network (E-UTRAN) and an evolved packet core network (EPC network). At an early stage of an EPS network construction, an operator has already had a mature circuit switched (CS) network; however, the EPS network processes only a packet switched (PS) service. For protection of CS network investment and a deployment policy of the EPS network, the operator may use an original CS mobility management device to provide a CS service. To meet this requirement, 3GPP extends a function of a Gs interface between a mobile switching center/visitor location register (MSC/VLR) and a serving GPRS support node (SGSN) that are in the existing 2G or 3G network, and defines an SGs interface between the MSC/VLR and a mobility management entity (MME) in the EPC network, where GPRS is short for general packet radio service. Based on a function of the SGs interface, 3GPP proposes a "circuit switched fallback" (CSFB) technology and a short message service message over SGs (SMS over SGs) technology. By means of the CSFB technology, a user equipment (UE) covered by an E-UTRAN falls back to a CS domain in the 2G/3G network by using the E-UTRAN when a CS voice service needs to be processed, so as to complete processing of the CS voice service. By means of the SMS over SGs technology, the UE that resides in the E-UTRAN reuses an existing CS domain device to implement transmission of a short message service message in the CS domain.

To greatly reduce heavy deployment costs of a radio access network for an operator, 3GPP proposes a network sharing idea, i.e., public land mobile networks (PLMN) of multiple operators or multiple PLMNs of one operator can share a same radio access network to provide a wireless communication service. For the CSFB technology and the SMS over SGs technology, an operator also proposes a requirement for CS domain network sharing, which mainly has the following two scenarios:

Scenario 1: A conventional operator upgrades an existing CS domain network (including a 2G network and a 3G network), to support the CSFB technology and the SMS over SGs technology, i.e., the operator can provide, by sharing multiple PLMNs operated by the operator or sharing a PLMN of another operator by signing a roaming agreement, a CS service for a UE that resides in an E-UTRAN.

Scenario 2: An operator who provides an emerging pure PS service leases a CS domain network from a conventional operator by signing an agreement, to support the CSFB technology and the SMS over SGs technology.

In the foregoing scenarios of CS domain network sharing, multiple available PLMNs may provide a CS service for a same UE that resides in an E-UTRAN. During a combined attach procedure or a combined tracking area update procedure that is initiated by the UE, if multiple available PLMNs provides a CS service for the UE, an MME selects a proper PLMN according to a PLMN, location information of a tracking area in which the UE is currently located, and a CS domain network selection policy of an operator, where the PLMN, the location information, and the CS domain network selection policy are reported by an evolved NodeB (eNB). Based on the selected PLMN and the location information of the tracking area in which the UE is located, a corresponding CS domain location area identity (LAI) is allocated to the UE, and an associated MSC/VLR is selected based on the LAI. After the combined attach procedure is complete, the UE receives an attach accept message sent by the MME, where the attach accept carries a tracking area identity list (TAI list), a LAI, and a VLR temporary mobile subscriber identity (TMSI). For the UE, that the UE acquires the LAI and the VLR TMSI indicates that CS domain attaching is successful.

After the combined attach procedure is complete, the UE succeeds in registering with a network of an operator, and the UE needs to display a name of the registered network. Alternatively, after the combined tracking area update procedure, the UE needs to display a name of a registered network. Currently, the UE displays a network name mainly based on two policies.

Policy 1: A network side does not perform configuration, and the UE displays a network name according to a configuration of the UE.

Specifically, the UE displays, according to a PLMN identity (ID) of a currently registered network, a network name corresponding to the PLMN ID.

However, in some scenarios, the UE cannot determine which network name, corresponding to a PLMN ID, to display.

Policy 2: The network side delivers a to-be-displayed network name to the UE.

When receiving a network name delivered by the network side, the UE may use the received network name to update a network name configured by the UE, and display the updated network name.

(1) The MME informs the UE of the to-be-displayed network name by using an E-UTRAN mobility management information (EMM information) message, and the UE displays the informed network name, where the network name informed by the MME is determined by the MME according to a home PLMN (HPLMN) of the MME.

(2) An MSC/VLR delivers a network name of a CS domain network, with which the UE registers, to the MME through an SGs interface. The MME informs the UE of the to-be-displayed network name by using the EMM Information message, and the UE displays the informed network name, where the network name informed by the MME is a network name that is of the HPLMN of the MME and is determined by the MME according to a policy of the MME, or is a network name of the CS domain network with which the UE registers by using the MSC/VLR.

However, in the policy in which the network side delivers a network name to the UE for displaying, in some scenarios, the UE cannot determine a to-be-displayed network name, and the MME does not learn which network name is displayed on the UE either.

SUMMARY

In view of this, embodiments of the present invention provide a method and an apparatus for displaying a network name, to resolve a problem where in the prior art, a change in a network name displayed on a UE causes poor user experience.

According to a first aspect, a method for displaying a network name is provided and includes:

acquiring, by a first mobility management device in a first network, first network name information, where the first network name information is a network name currently displayed on a user equipment UE, and/or a public land mobile network identity PLMN ID corresponding to the network name that is currently displayed on the UE, and the first network is a network with which the UE currently registers or a network of two networks with which the UE currently jointly register; and if the UE switches over to a second network during a process of executing a service, sending, by the first mobility management device, the first network name information to a second mobility management device in the second network, so that the second mobility management device sends, to the UE for displaying, a network name corresponding to the first network name information.

In a first possible implementation manner of the first aspect, if the second network is a 2G network, after the sending the first network name information to a second mobility management device in the second network, the method further includes: instructing, by the first mobility management device, a third mobility management device in the second network not to send second network name information to the UE, where the second network name information is any network name and/or a PLMN ID corresponding to the any network name, the third mobility management device is a mobility management device of a circuit switched domain in the 2G, and the second mobility management device is a mobility management device of a packet switched domain in the 2G network; or, the third mobility management device is a mobility management device of the packet switched domain in the 2G network, and the second mobility management device is a mobility management device of the circuit switched domain in the 2G network; or if the second network is a 3G network, after the sending the first network name information to a second mobility management device in the second network, the method further includes: instructing, by the first mobility management device, a third mobility management device in the second network not to send second network name information to the UE, where the second network name information is any network name and/or a PLMN ID corresponding to the any network name, the third mobility management device is a mobility management device of a circuit switched domain in the 3G network, and the second mobility management device is a mobility management device of a packet switched domain in the 3G network; or, the third mobility management device is a mobility management device of the packet switched domain in the 3G network, and the second mobility management device is a mobility management device of the circuit switched domain in the 3G network.

With reference to the first possible implementation manner of the first aspect, in a second possible implementation manner, the instructing, by the first mobility management device, a third mobility management device in the second network not to send second network name information to the UE includes:

instructing, by the first mobility management device by using a request message, the third mobility management device not to send the second network name information to the UE, where the request message includes indication information, and the indication information is used to instruct the third mobility management device not to send the second network name information to the UE.

With reference to the second possible implementation manner of the first aspect, in a third possible implementation manner, the indication information is specifically used to instruct the third mobility management device not to send, to the UE, a universal mobile telecommunications system territorial radio access network E-UTRAN mobility management information EMM information message, or a general packet radio service GPRS mobility management information GMM information message or mobility management information MM information message.

With reference to the first aspect or any possible implementation manner of the first aspect, in a fourth possible implementation manner, that the UE switches over to a second network during a process of executing a service includes:

executing a circuit switched fallback CSFB service to enable the UE to fall back from the first network to the second network.

With reference to the fourth possible implementation manner of the first aspect, in a fifth possible implementation manner, the sending, by the first mobility management device, the first network name information to a second mobility management device includes:

sending, by the first mobility management device, the first network name information to the second mobility management device by using an update request message or a service request message, where the first mobility management device is a first mobility management entity MME, and the second mobility management device is a second mobile switching center server MSC server; or sending, by the first mobility management device, the first network name information to the second mobility management device by using a send identification message, where the first mobility management device is a first MSC server, and the second mobility management device is a second MSC server.

With reference to the first aspect or any of the first to the third possible implementation manners of the first aspect, in a sixth possible implementation manner, that the UE switches over to a second network during a process of executing a service includes:

handing over the UE to the second network during a process of executing a voice service.

With reference to the sixth possible implementation manner of the first aspect, in a seventh possible implementation manner, the sending, by the first mobility management device, the first network name information to a second mobility management device includes:

sending, by the first mobility management device, the first network name information to the second mobility management device by using a handover message.

With reference to the seventh possible implementation manner of the first aspect, in an eighth possible implementation manner, the sending, by the first mobility management device, the first network name information to the second mobility management device by using a handover message includes:

sending, by the first mobility management device, the first network name information to the second mobility management device by using a packet switched to circuit switched PS to CS handover message, where the first network is a first packet switched domain network, and the second network is a second circuit switched domain network; or sending, by the first mobility management device, the first network name information to the second mobility management device by using a circuit switched to packet switched CS to PS handover message, where the first network is a first circuit switched domain network, and the second network is a second packet switched domain network; or sending, by the first mobility management device, the first network name information to the second mobility management device by using a circuit switched to circuit switched CS to CS handover message, where the first network is a first circuit switched domain network, and the second network is a second circuit switched domain network.

With reference to the second or the third possible implementation manner of the first aspect, in a ninth possible implementation manner, if the service is a circuit switched fallback CSFB service, the request message is a location update request message or a service request message, the first network is a Long Term Evolution network, the first mobility management device is a first mobility management entity MME, the second mobility management device is a second serving gateway support node SGSN, and the third mobility management device is a second mobile switching center MSC server; or if the service is a CSFB service, the request message is a context request message or a handover request message, the first mobility management device is a first MME, the second mobility management device is a second MSC server, and the third mobility management device is a second SGSN; or if the service is a voice service, the request message is a handover message, the first mobility management device is a first MME, the second mobility management device is a second SGSN, and the third mobility management device is a second MSC server; or if the service is a voice service, the request message is a handover message, the first mobility management device is a first SGSN, the second mobility management device is a second MME, and the third mobility management device is a second MSC server; or if the service is a voice service, the request message is a packet switched to circuit switched PS to CS handover message, the first mobility management device is a first MME, the second mobility management device is a second MSC server, and the third mobility management device is a second MME; or if the service is a voice service, the request message is a PS to CS handover message, the first mobility management device is a first MME, the second mobility management device is a second SGSN, and the third mobility management device is a second MSC server.

With reference to the first aspect or any possible implementation manner of the first aspect, in a tenth possible implementation manner, the acquiring, by a first mobility management device in a first network, first network name information includes: acquiring, by the first mobility management device, the first network name information by using a first configuration, where the first configuration is a predetermined network name and/or a PLMN ID corresponding to the predetermined network name, the first configuration is the same as a second configuration of the UE, and the UE displays a network name according to the second configuration of the UE; or before the acquiring, by a first mobility management device in a first network, first network name information, the method further includes: sending, by the first mobility management device, to the UE, the network name currently displayed on the UE; and the acquiring, by a first mobility management device, first network name information includes: acquiring, by the first mobility management device, the first network name information corresponding to the network name that is sent by the first mobility management device.

According to a second aspect, a method for displaying a network name is provided and includes:

if a user equipment UE switches over from a first network to a second network during a process in which the UE executes a service in the first network, receiving, by a second mobility management device in the second network, network name information sent by a first mobility management device in the first network, where the network name information is a network name currently displayed on the UE, and/or a public land mobile network identity PLMN ID corresponding to the network name that is currently displayed on the UE; and sending, by the second mobility management device to the UE for displaying, the network name corresponding to the network name information.

In a first possible implementation manner of the second aspect, the service is a circuit switched fallback CSFB service, and the receiving, by a second mobility management device, network name information sent by a first mobility management device includes:

receiving, by the second mobility management device by using an update request message or a service request message, the network name information sent by the first mobility management device, where the first mobility management device is a mobility management entity first MME, and the second mobility management device is a mobile switching center server second MSC server; or receiving, by the second mobility management device by using a send identification message, the network name information sent by the first mobility management device, where the first mobility management device is a first MSC server, and the second mobility management device is a second MSC server.

In a second possible implementation manner of the second aspect, the service is a voice service;

the receiving, by a second mobility management device, network name information sent by a first mobility management device includes:

receiving, by the second mobility management device, the network name information by using a handover message.

With reference to the second possible implementation manner of the second aspect, in a third possible implementation manner of the second aspect, the receiving, by the second mobility management device, the network name information by using a handover message includes:

receiving, by the second mobility management device, the network name information by using a packet switched to circuit switched PS to CS handover message, where the first network is a first packet switched domain network, and the second network is a second circuit switched domain network; or receiving, by the second mobility management device, the network name information by using a circuit switched to packet switched CS to PS handover message, where the first network is a first circuit switched domain network, and the second network is a second packet switched domain network; or receiving, by the second mobility management device, the network name information by using a circuit switched to circuit switched CS to CS handover message, where the first network is a first circuit switched domain network, and the second network is a second circuit switched domain network.

According to a third aspect, a network device is provided, where the network device is a first mobility management device in a first network and includes:

an acquiring module, configured to acquire first network name information, where the first network name information is a network name currently displayed on a user equipment UE, and/or a public land mobile network identity PLMN ID corresponding to the network name that is currently displayed on the UE, and the first network is a network with which the UE currently registers or a network of two networks with which the UE currently jointly register; and a sending module, configured to: if the UE switches over to a second network during a process of executing a service, send the first network name information acquired by the acquiring module to a second mobility management device in the second network, so that the second mobility management device sends, to the UE for displaying, a network name corresponding to the first network name information.

In a first possible implementation manner of the third aspect, if the second network is a 2G network, the sending module is further configured to: after the sending the first network name information to a second mobility management device in the second network, instruct a third mobility management device in the second network not to send second network name information to the UE, where the second network name information is any network name and/or a PLMN ID corresponding to the any network name, the third mobility management device is a mobility management device of a circuit switched domain in the 2G, and the second mobility management device is a mobility management device of a packet switched domain in the 2G network; or, the third mobility management device is a mobility management device of the packet switched domain in the 2G network, and the second mobility management device is a mobility management device of the circuit switched domain in the 2G network; or if the second network is a 3G network, the sending module is further configured to: after the sending the first network name information to a second mobility management device in the second network, instruct a third mobility management device in the second network not to send second network name information to the UE, where the second network name information is any network name and/or a PLMN ID corresponding to the any network name, the third mobility management device is a mobility management device of a circuit switched domain in the 3G, and the second mobility management device is a mobility management device of a packet switched domain in the 3G network; or, the third mobility management device is a mobility management device of the packet switched domain in the 3G network, and the second mobility management device is a mobility management device of the circuit switched domain in the 3G network.

With reference to the first possible implementation manner of the third aspect, in a second possible implementation manner, the sending module is specifically configured to instruct, in the following manner, the third mobility management device in the second network not to send the second network name information to the UE: instructing, by using a request message, the third mobility management device not to send the second network name information to the UE, where the request message includes indication information, and the indication information is used to instruct the third mobility management device not to send the second network name information to the UE.

With reference to the second possible implementation manner of the third aspect, in a third possible implementation manner, the sending module is specifically configured to send the request message that carries the indication information, where the indication information is specifically used to instruct the third mobility management device not to send, to the UE, a universal mobile telecommunications system terrestrial radio access network E-UTRAN mobility management information EMM information message, or a general packet radio service GPRS mobility management information GMM information message or mobility management information MM information message.

With reference to the third aspect or any possible implementation manner of the third aspect, in the fourth possible implementation manner, if the service is a circuit switched fallback CSFB service, the sending module is specifically configured to send, in the following manner, the first network name information to the second mobility management device:

sending the first network name information to the second mobility management device by using an update request message or a service request message, where the first mobility management device is a first mobility management entity MME, and the second mobility management device is a first mobile switching center server MSC server; or sending the first network name information to the second mobility management device by using a send identification message, where the first mobility management device is a first MSC server, and the second mobility management device is a second MSC server.

With reference to the third aspect or any possible implementation manner of the third aspect, in a fifth possible implementation manner, if the service is a voice service, the sending module is specifically configured to send, in the following manner, the first network name information to the second mobility management device:

sending the first network name information to the second mobility management device by using a handover message.

With reference to the fourth possible implementation manner of the third aspect, in a sixth possible implementation manner, the sending module is specifically configured to send, in the following manner, the first network name information to the second mobility management device by using a handover message: sending the first network name information to the second mobility management device by using a packet switched to circuit switched PS to CS handover message, where the first network is a first packet switched domain network, and the second network is a second circuit switched domain network; or sending the first network name information to the second mobility management device by using a circuit switched to packet switched CS to PS handover message, where the first network is a first circuit switched domain network, and the second network is a second packet switched domain network; or sending the first network name information to the second mobility management device by using a circuit switched to circuit switched CS to CS handover message, where the first network is a first circuit switched domain network, and the second network is a second circuit switched domain network.

With reference to the second or the third possible implementation manner of the third aspect, in a seventh possible implementation manner, if the service is a circuit switched fallback CSFB service, the sending module is specifically configured to instruct, in the following manner and by using a request message, the third mobility management device not to send the second network name information to the UE:

instructing, by using a location update request message or a service request message, the third mobility management device not to send the second network name information to the UE, where the request message is the location update request message or the service request message, the first network is a Long Term Evolution network, the first mobility management device is a first mobility management entity MME, the second mobility management device is a second serving gateway support node SGSN, and the third mobility management device is a second mobile switching center server MSC server; or instructing, by using a context request message or a handover request message, the third mobility management device not to send the second network name information to the UE, where the request message is the context request message or the handover request message, the first mobility management device is a first MME, the second mobility management device is a second MSC server, and the third mobility management device is a second SGSN; or if the service is a voice service, the sending module is specifically configured to instruct, in the following manner and by using a request message, the third mobility management device not to send the second network name information to the UE:

instructing, by sending a handover message, the third mobility management device not to send the second network name information to the UE, where the request message is the handover message, the first mobility management device is a first MME, the second mobility management device is a second SGSN, and the third mobility management device is a second MSC server; or instructing, by sending a handover message, the third mobility management device not to send the second network name information to the UE, where the request message is the handover message, the first mobility management device is a first SGSN, the second mobility management device is a second MME, and the third mobility management device is a second MSC server; or instructing, by sending a packet switched to circuit switched PS to CS handover message, the third mobility management device not to send the second network name information to the UE, where the request message is the PS to CS handover message, the first mobility management device is a first MME, the second mobility management device is a second MSC server, and the third mobility management device is a second MME; or instructing, by sending a PS to CS handover message, the third mobility management device not to send the second network name information to the UE, where the request message is the PS to CS handover message, the first mobility management device is a first MME, the second mobility management device is a second SGSN, and the third mobility management device is a second MSC server.

With reference to the third aspect or any possible implementation manner of the third aspect, in a eighth possible implementation manner, the network device further includes a storage module; where:

the storage module is configured to store a first configuration, where the first configuration is a predetermined network name and/or a PLMN ID corresponding to the predetermined network name, the first configuration is the same as a second configuration of the UE, and the UE displays a network name according to the second configuration of the UE; and the acquiring module is specifically configured to acquire the first network name information in the following manner: acquiring the first network name information corresponding to the first configuration that is stored by the storage module; or the sending module is further configured to send, to the UE, the network name currently displayed on the UE; and the storage module is configured to store the network name sent by the sending module, where the acquiring module is configured to acquire the first network name information in the following manner: acquiring the first network name information corresponding to the network name that is stored by the storage module.

According to a fourth aspect, a network device is provided, where the network device is a second mobility management device in a second network and includes:

a receiving module, configured to: if a user equipment UE switches over from a first network to the second network during a process of executing a service in the first network, receive network name information sent by a first mobility management device in the first network, where the network name information is a network name currently displayed on the UE, and/or a public land mobile network identity PLMN ID corresponding to the network name that is currently displayed on the UE; and a sending module, configured to send, to the UE for displaying, the network name corresponding to the network name information that is received by the receiving module.

In a first possible implementation manner of the fourth aspect, if the service is a circuit switched fallback CSFB service, the receiving module is specifically configured to receive, in the following manner, the network name information sent by the first mobility management device:

receiving, by using an update request message or a service request message, the network name information sent by the first mobility management device, where the first mobility management device is a mobility management entity MME, and the second mobility management device is a mobile switching center server second MSC server; or receiving, by using a send identification message, the network name information sent by the first mobility management device, where the first mobility management device is a first MSC server, and the second mobility management device is a second MSC server.

In a second possible implementation manner of the fourth aspect, the service is a voice service;

the receiving module is specifically configured to receive, in the following manner, the network name information sent by the first mobility management device:

receiving, by using a handover message, the network name information sent by the first mobility management device, where the first network is a first packet switched domain network, and the second network is a second packet switched domain network.

With reference to the second possible implementation manner of the fourth aspect, in a third possible implementation manner, the receiving module is specifically configured to receive, in the following manner and by using a handover message, the network name information sent by the first mobility management device:

receiving, by using a packet switched to circuit switched PS to CS handover message, the network name information sent by the first mobility management device, where the first network is the first packet switched domain network, and the second network is a second circuit switched domain network; or receiving, by using a circuit switched to packet switched CS to PS handover message, the network name information sent by the first mobility management device, where the first network is a first circuit switched domain network, and the second network is the second packet switched domain network; or receiving, by using a circuit switched to circuit switched CS to CS handover message, the network name information sent by the first mobility management device, where the first network is a first circuit switched domain network, and the second network is a second circuit switched domain network.

According to a fifth aspect, a network device is provided, where the network device is a first mobility management device in a first network and includes:

a processor, configured to acquire first network name information, where the first network name information is a network name currently displayed on a user equipment UE, and/or a public land mobile network identity PLMN ID corresponding to the network name that is currently displayed on the UE, and the first network is a network with which the UE currently registers or a network of two networks with which the UE currently jointly register; and a transmitter, configured to: if the UE switches over to a second network during a process of executing a service, send the first network name information acquired by the processor to a second mobility management device in the second network, so that the second mobility management device sends, to the UE for displaying, a network name corresponding to the first network name information.

In a first possible implementation manner of the fifth aspect, if the second network is a 2G network, the transmitter is further configured to: after the sending the first network name information to a second mobility management device in the second network, instruct a third mobility management device in the second network not to send second network name information to the UE, where the second network name information is any network name and/or a PLMN ID corresponding to the any network name, the third mobility management device is a mobility management device of a circuit switched domain in the 2G, and the second mobility management device is a mobility management device of a packet switched domain in the 2G network; or, the third mobility management device is a mobility management device of the packet switched domain in the 2G network, and the second mobility management device is a mobility management device of the circuit switched domain in the 2G network; or if the second network is a 3G network, the transmitter is further configured to: after the sending the first network name information to a second mobility management device in the second network, instruct a third mobility management device in the second network not to send second network name information to the UE, where the second network name information is any network name and/or a PLMN ID corresponding to the any network name, the third mobility management device is a mobility management device of a circuit switched domain in the 3G, and the second mobility management device is a mobility management device of a packet switched domain in the 3G network; or, the third mobility management device is a mobility management device of the packet switched domain in the 3G network, and the second mobility management device is a mobility management device of the circuit switched domain in the 3G network.

With reference to the first possible implementation manner of the fifth aspect, in a second possible implementation manner, the transmitter is specifically configured to instruct, in the following manner, the third mobility management device in the second network not to send the second network name information to the UE: instructing, by using a request message, the third mobility management device not to send the second network name information to the UE, where the request message includes indication information, and the indication information is used to instruct the third mobility management device not to send the second network name information to the UE.

With reference to the second possible implementation manner of the fifth aspect, in a third possible implementation manner, the transmitter is specifically configured to send the request message that carries the indication information, where the indication information is specifically used to instruct the third mobility management device not to send, to the UE, a universal mobile telecommunications system terrestrial radio access network E-UTRAN mobility management information EMM information message, or a general packet radio service GPRS mobility management information GMM information message or mobility management information MM information message.

With reference to the fifth aspect or any possible implementation manner of the fifth aspect, in the fourth possible implementation manner, if the service is a circuit switched fallback CSFB service, the transmitter is specifically configured to send, in the following manner, the first network name information to the second mobility management device:

sending the first network name information to the second mobility management device by using an update request message or a service request message, where the first mobility management device is a first mobility management entity MME, and the second mobility management device is a second mobile switching center server MSC server; or sending the first network name information to the second mobility management device by using a send identification message, where the first mobility management device is a first MSC server, and the second mobility management device is a second MSC server.

With reference to the fifth aspect or any possible implementation manner of the fifth aspect, in a fifth possible implementation manner, if the service is a voice service, the transmitter is specifically configured to send, in the following manner, the first network name information to the second mobility management device:

sending the first network name information to the second mobility management device by using a handover message.

With reference to the fifth possible implementation manner of the fifth aspect, in a sixth possible implementation manner, the transmitter is specifically configured to send, in the following manner, the first network name information to the second mobility management device by using a handover message:

sending the first network name information to the second mobility management device by using a packet switched to circuit switched PS to CS handover message, where the first network is a first packet switched domain network, and the second network is a second circuit switched domain network; or sending the first network name information to the second mobility management device by using a circuit switched to packet switched CS to PS handover message, where the first network is a first circuit switched domain network, and the second network is a second packet switched domain network; or sending the first network name information to the second mobility management device by using a circuit switched to circuit switched CS to CS handover message, where the first network is a first circuit switched domain network, and the second network is a second circuit switched domain network.

With reference to the second or the third possible implementation manner of the fifth aspect, in a seventh possible implementation manner, if the service is a circuit switched fallback CSFB service, the transmitter is specifically configured to instruct, in the following manner and by using a request message, the third mobility management device not to send the second network name information to the UE:

instructing, by using a location update request message or a service request message, the third mobility management device not to send the second network name information to the UE, where the request message is the location update request message or the service request message, the first network is a Long Term Evolution network, the first mobility management device is a first mobility management entity MME, the second mobility management device is a second serving gateway support node SGSN, and the third mobility management device is a second mobile switching center server MSC server; or instructing, by using a context request message or a handover request message, the third mobility management device not to send the second network name information to the UE, where the request message is the context request message or the handover request message, the first mobility management device is a first MME, the second mobility management device is a second MSC server, and the third mobility management device is a second SGSN; or if the service is a voice service, the transmitter is specifically configured to instruct, in the following manner and by using a request message, the third mobility management device not to send the second network name information to the UE:

instructing, by sending a handover message, the third mobility management device not to send the second network name information to the UE, where the request message is the handover message, the first mobility management device is a first MME, the second mobility management device is a second SGSN, and the third mobility management device is a second MSC server; or instructing, by sending a handover message, the third mobility management device not to send the second network name information to the UE, where the request message is the handover message, the first mobility management device is a first SGSN, the second mobility management device is a second MME, and the third mobility management device is a second MSC server; or instructing, by sending a packet switched to circuit switched PS to CS handover message, the third mobility management device not to send the second network name information to the UE, where the request message is the PS to CS handover message, the first mobility management device is a first MME, the second mobility management device is a second MSC server, and the third mobility management device is a second MME; or instructing, by sending a PS to CS handover message, the third mobility management device not to send the second network name information to the UE, where the request message is the PS to CS handover message, the first mobility management device is a first MME, the second mobility management device is a second SGSN, and the third mobility management device is a second MSC server.

With reference to the fifth aspect or any possible implementation manner of the fifth aspect, in an eighth possible implementation manner, the network device further includes a memory; where:

the memory is configured to store a first configuration, where the first configuration is a predetermined network name and/or a PLMN ID corresponding to the predetermined network name, the first configuration is the same as a second configuration of the UE, and the UE displays a network name according to the second configuration of the UE; and the processor is specifically configured to acquire the first network name information in the following manner: acquiring the first network name information corresponding to the first configuration that is stored by the memory; or the transmitter is further configured to send, to the UE, the network name currently displayed on the UE; and the memory is configured to store the network name sent by the transmitter, where the processor is configured to acquire the first network name information in the following manner: acquiring the first network name information corresponding to the network name that is stored by the memory.

According to a sixth aspect, a network device is provided, where the network device is a second mobility management device in a second network and includes:

a receiver, configured to: if a user equipment UE switches over from a first network to the second network during a process of executing a service in the first network, receive network name information sent by a first mobility management device in the first network, where the network name information is a network name currently displayed on the UE, and/or a public land mobile network identity PLMN ID corresponding to the network name that is currently displayed on the UE; and a transmitter, configured to send, to the UE for displaying, the network name corresponding to the network name information that is received by the receiver.

In a first possible implementation manner of the sixth aspect, if the service is a circuit switched fallback CSFB service, the receiver is specifically configured to receive, in the following manner, the network name information sent by the first mobility management device:

receiving, by using an update request message or a service request message, the network name information sent by the first mobility management device, where the first mobility management device is a mobility management entity MME, and the second mobility management device is a mobile switching center server second MSC server; or receiving, by using a send identification message, the network name information sent by the first mobility management device, where the first mobility management device is a first MSC server, and the second mobility management device is a second MSC server.

In a second possible implementation manner of the sixth aspect, the service is a voice service;

the receiver is specifically configured to receive, in the following manner, the network name information sent by the first mobility management device:

receiving, by using a handover message, the network name information sent by the first mobility management device.

With reference to the second possible implementation manner of the sixth aspect, in a third possible implementation manner, the receiver is specifically configured to receive, in the following manner and by using a handover message, the network name information sent by the first mobility management device:

receiving, by using a packet switched to circuit switched PS to CS handover message, the network name information sent by the first mobility management device, where the first network is a first packet switched domain network, and the second network is a second circuit switched domain network; or receiving, by using a circuit switched to packet switched CS to PS handover message, the network name information sent by the first mobility management device, where the first network is a first circuit switched domain network, and the second network is a second packet switched domain network; or receiving, by using a circuit switched to circuit switched CS to CS handover message, the network name information sent by the first mobility management device, where the first network is a first circuit switched domain network, and the second network is a second circuit switched domain network.

In the foregoing technical solutions, that a network name displayed on a terminal is consistent with a network name, displayed on a UE, which is recorded by a network device is ensured, and a problem where the network name displayed on the UE changes during an executing process is avoided, thereby ensuring consistency of a network name displayed on the UE with a network name stored in the network device, and improving user experience.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments, and a person skilled in the art may still derive other drawings from these accompanying drawings.

DESCRIPTION OF EMBODIMENTS

Figure 1:
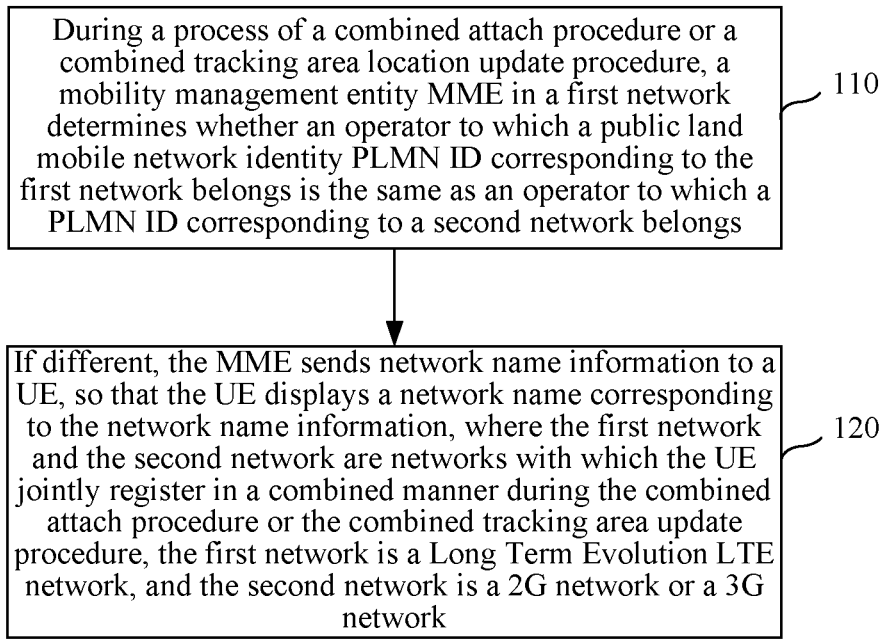
FIG. 1 is a flowchart of a method for displaying a network name according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

For the foregoing policy 2, an EMM Information message sent by an MME is an optional message, i.e., the MME may not send an EMM Information message to a UE. However, if the MME does not send the EMM Information message to the UE, the MME does not learn whether the UE displays a network name corresponding to a PLMN ID of an LTE network or a network name corresponding to a PLMN ID of a CS domain network.

In another aspect, for example, when performing a VoIP service in a 3G network (such as a high speed uplink packet access (HSUPA) network), the UE is handed over to the LTE network. In this case, when a user dials or accepts or triggers the VoIP service, the UE displays a network name of a 3G network; therefore, the user determines, according to a network name currently displayed on the UE, that a network in which the UE currently resides or a network that serves the UE is a 3G network. However, if the UE executes a PS handover (HO) during a process of executing the VoIP service, so as to be handed over to the LTE network, the UE receives, when executing a combined tracking area update procedure on the LTE network, the EMM information message sent by the MME in the LTE network. In this case, the UE displays a network name informed by the EMM information message. If a network name of the 3G network is different from the network name informed by the EMM Information message, user experience may be lowered, resulting in a complaint. Therefore, to avoid this problem, during the process of this VoIP service, a change, due to execution of the PS HO, in a network name displayed on the UE needs to be avoided.

Alternatively, when the UE executes a CS domain voice service in a 2G network or a 3G network, a network name displayed on the UE may be a network name of the 2G network or the 3G network. However, when reverse single radio voice call continuity (rSRVCC) needs to be executed during a continuation process of executing the voice service, the UE is handed over to an LTE network or a 3G network. In this case, the UE displays a corresponding network name according to a PLMN ID of a currently used LTE network or 3G network; or if the UE receives a GMM information sent by an SGSN in the 3G network or an EMM information message sent by an MME in the LTE network, the UE displays a network name informed by the GMM Information message or the EMM information message. In this case, a network name displayed on the UE when the UE triggers the CS domain voice service may be inconsistent with a network name displayed on the UE when the UE is handed over to the LTE or 3G network.

It should be noted that the CS domain network in all embodiments of the present invention may include a 2G network or a 3G network, or a 1×RTT network of a Code Division Multiple Access (CDMA) network.

To resolve the foregoing problem, an embodiment of the present invention provides a method for displaying a network name. As shown in FIG. 1, the method includes the following steps:

Step 110: During a process of a combined attach procedure or a combined tracking area update procedure, a mobility management entity MME in a first network determines whether an operator to which a public land mobile network identity PLMN ID corresponding to the first network belongs is the same as an operator to which a PLMN ID corresponding to a second network belongs.

Step 120: If the operator to which a public land mobile network identity PLMN ID corresponding to the first network belongs is different from the operator to which a PLMN ID corresponding to a second network belongs, the MME sends network name information to a UE, so that the UE displays a network name corresponding to the network name information, where the first network and the second network are networks with which the UE jointly register during the combined attach procedure or the combined tracking area update procedure, the first network is a Long Term Evolution (LTE) network, and the second network is a 2G network or a 3G network.

In this embodiment, a mobility management device in the first network sends the network name information to the UE, so that the UE can display the corresponding network name according to the received network name information, thereby avoiding the following problems: the mobility management device does not learn whether the UE displays a network name corresponding to a PLMN ID of the LTE network or a network name corresponding to a PLMN ID of a CS domain network; and the UE cannot determine which network name, corresponding to a PLMN ID, to display.

Figure 2:
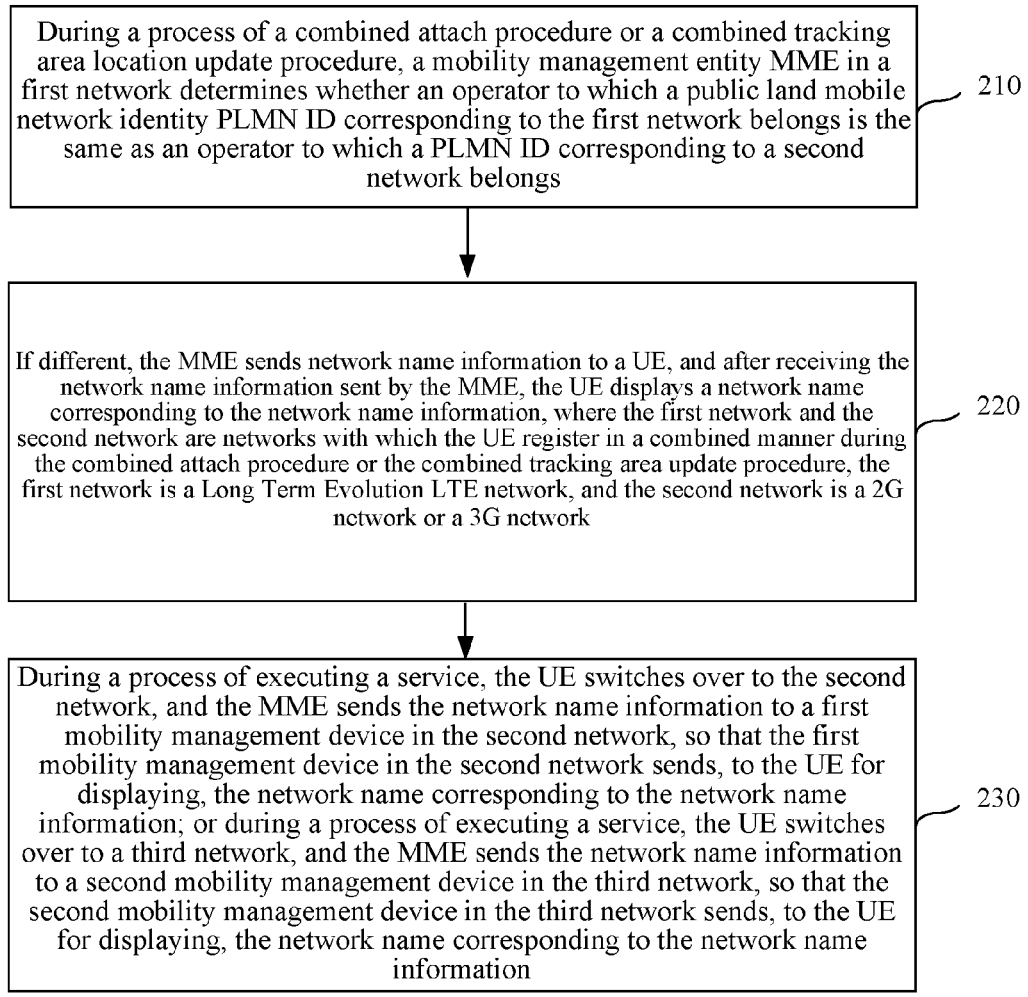
FIG. 2 is a flowchart of a method for displaying a network name according to another embodiment of the present invention.

Another embodiment of the present invention further provides a method for displaying a network name. As shown in FIG. 2, the method includes the following steps:

Step 210: During a process of a combined attach procedure or a combined tracking area update procedure, a mobility management entity MME in a first network determines whether an operator to which a public land mobile network identity PLMN ID corresponding to the first network belongs is the same as an operator to which a PLMN ID corresponding to a second network belongs.

The first network is one of networks to which a UE attaches in a combined manner, for example, an LTE network.

Step 220: If different, the MME sends network name information to a UE, and after receiving the network name information sent by the MME, the UE displays a network name corresponding to the network name information, where the first network and the second network are networks with which the UE jointly register during the combined attach procedure or the combined tracking area update procedure, the first network is a Long Term Evolution LTE network, and the second network is a 2G network or a 3G network.

The network name information may be a network name, may also be a PLMN ID, and may further be a network name and a PLMN ID.

Specifically, if the combined attach procedure or the combined tracking area update procedure is executed, the UE attaches to the LTE network and the 2G network in a combined manner or attaches to the LTE network and the 3G network in a combined manner, the MME may be an MME in the LTE network, and the MME may send the network name information to the UE by using an EMM information message. A difference from the prior art lies in that, in this embodiment, if the MME determines that an operator to which a PLMN ID of the LTE network belongs is different from an operator to which a PLMN ID of a CS domain network belongs, the EMM information message is a message that must be sent, but not an optional message.

If the operator to which the PLMN ID of the LTE network belongs is different from the operator to which a PLMN ID of the 2G or 3G network belongs, the MME sends the network name information to the UE, where the network name information may be a home PLMN ID of the MME, may also be the PLMN ID of the LTE network, and may further be the PLMN ID of the CS domain network.

Further, in this embodiment, if the operator to which the PLMN ID of the LTE network belongs is the same as the operator to which the PLMN ID of the 2G or 3G network belongs, the MME may send the EMM information message to the UE, or may not send the EMM information message to the UE. That is, if the operator to which the PLMN ID of the LTE network belongs is the same as the operator to which the PLMN ID of the 2G or 3G network belongs, the EMM information message is still an optional message.

In this embodiment of the present invention, if an MME determines that an operator to which a PLMN ID of an LTE network belongs is different from an operator to which a PLMN ID of a 2G or 3G network belongs, the MME sends an EMM Information message to a UE, and the message is a message that must be sent. This avoids a problem where during or after a process of executing a CSFB combined attach procedure and a combined tracking area update procedure, the UE cannot determine which network name to display. In addition, that a network name displayed on a terminal is consistent with a network name, displayed on the UE, which is recorded by a mobility management device is ensured, thereby avoiding a problem where the network name displayed on the UE changes during the executing process, ensuring consistency of a network name displayed on the UE with a network name stored in the network device, and improving user experience.

Further, if the first network is an LTE network, during a process of executing a CSFB service, the UE falls back from the first network to a second network. In this case, the network name displayed on the UE may change, which easily causes poor user experience. Likewise, the UE may encounter a same problem when executing a voice service. To overcome this problem, the foregoing method may further include the following step:

Step 230: During a process of executing a service, the UE switches over to the second network, and the MME sends the network name information to a first mobility management device in the second network, so that the first mobility management device in the second network sends, to the UE for displaying, the network name corresponding to the network name information; or during a process of executing a service, the UE switches over to a third network, and the MME sends the network name information to a second mobility management device in the third network, so that the second mobility management device in the third network sends, to the UE for displaying, the network name corresponding to the network name information.

Specifically, a circuit switched fallback CSFB service is executed to enable the UE to fall back to the second network, the MME sends the network name information to the mobility management device in the second network, the mobility management device in the second network sends the network name information to the UE, and the UE displays the network name corresponding to the network name information. In this case, the second network is an LTE network.

Alternatively, a voice service is executed to enable the UE to be handed over to the second network, the MME sends the network name information to the mobility management device in the second network, the mobility management device in the second network sends the network name information to the UE, and the UE displays the network name corresponding to the network name information.

The MME sends, to the mobility management device in the second network, the network name information previously sent to the UE, and the mobility management device in the second network sends the network name information to the UE for displaying. In this way, the network name displayed in the UE is the same as the previously displayed network name.

Another embodiment of the present invention provides a method for displaying a network name.

In the prior art, after a UE attaches to an LTE network, the UE displays a network name of the LTE network. However, when a CSFB service triggers the UE to fall back to a 2G network or a 3G network, or a voice service is switched over to the 2G network, the 3G network, or a 4G network (for example, the LTE network), the UE displays a network name of the 2G network, the 3G network, or the 4G network in which the UE currently resides. Alternatively, if the UE falls back to a 2G network or a 3G network, or a voice service is switched over to a 2G network, a 3G network, or a 4G network (for example, the LTE network), and the UE receives a GPRS mobility management information (GMM information) message sent by an SGSN in the 2G network or the 3G network; or if the UE receives a mobility management information (MM Information) message sent by an MSC/VLR in the 2G network or the 3G network, the UE displays a network name informed by the GMM information message or the MM information message; or if the UE receives an E-UTRAN mobility management information (EMM Information) message sent by an MME in the 4G network, the UE displays a network name informed by the EMM information message.

Alternatively, in the prior art, when the UE performs a Voice over Internet Protocol (VoIP) service in a 3G network, the UE is handed over to the LTE network. In this case, when a user dials or accepts or triggers the VoIP service, the UE displays a network name of the 3G network; therefore, the user determines, according to a network name currently displayed in the UE, that a network in which the UE currently resides or a network that serves the UE is a 3G network. However, if the UE executes a PS handover during a process of executing the VoIP service, so as to be handed over to the LTE network, and executes a combined tracking area update procedure in the LTE network, the UE displays a network name informed by received EMM information; or, if EMM information is not received by the UE, the UE displays a network name of a network on which the UE is currently located.

However, if a network name displayed on the UE after the UE attaches to the LTE network is inconsistent with a network name displayed on the UE when the UE falls back to the 2G network or the 3G network, or network names displayed on the UE during a process of executing the VoIP service are inconsistent, user experience is poor, which easily causes a user complaint.

For example, during a process of executing a CSFB service, when the user dials or accepts or triggers the CSFB service, the network name displayed on the UE may be a network name of the LTE network. However, when the UE falls back to the 2G network, the UE displays a corresponding network name according to a PLMN ID of the currently used 2G network; or when the UE falls back to the 3G network, the UE displays a corresponding network name according to a PLMN ID of the currently used 3G network. Alternatively, if the UE receives a GMM information message sent by an SGSN in the 2G network or the 3G network, or the UE receives an MM information message sent by an MSC/VLR in the 2G network or the 3G network, the UE displays a network name informed by the GMM information message or the MM information message. In this case, a network name displayed on the UE when the user dials or accepts or triggers the CSFB service may be inconsistent with a network name displayed on the UE when the UE falls back to the 2G network or the 3G network.

For another example, after the UE triggers a VoIP service in the LTE network, a user determines, according to a network name currently displayed on the UE, a network in which the UE currently resides or a network that currently serves the UE. In this case, the network name displayed on the UE may be a network name of the LTE network. However, when single radio voice call continuity (SRVCC) needs to be executed during a process of executing a VoIP voice service, the UE is handed over to a 2G network or 3G network, and in this case, the UE displays a corresponding network name according to a PLMN ID of a currently used 2G network or 3G network; or if the UE receives a GMM information message sent by an SGSN in a 2G network or 3G network, or if the UE receives an MM information message sent by an MSC/VLR in a 2G network or 3G network, the UE displays a network name informed by the GMM information message or the MM information message. In this case, a network name displayed on the UE when the UE triggers the VoIP service may be inconsistent with a network name displayed on the UE when the UE falls back to the 2G network or the 3G network.

For another example, when the UE executes a CS domain voice service in a 2G network or a 3G network, a network name displayed on the UE may be a network name of the 2G or 3G network. However, when reverse single radio voice call continuity (rSRVCC) needs to be executed during a continuation process of executing the voice service, the UE is handed over to an LTE network or a 3G (such as HSPA) network. In this case, the UE displays a corresponding network name according to a PLMN ID of a currently used LTE network or 3G network; or if the UE receives a GMM information message sent by an SGSN in the 3G network or receives an EMM information message sent by an MME in the LTE network, or if the UE receives an MM information message sent by an MSC/VLR in the 3G network, the UE displays a network name informed by the GMM Information message, the EMM information message or the MM information message. In this case, a network name displayed on the UE when the UE triggers the CS domain voice service may be inconsistent with a network name displayed on the UE when the UE is handed over to the LTE or 3G network.

For another example, when the UE executes a CS domain voice service in a 2G network or a 3G network, a network name displayed on the UE may be a network name of the 2G network or the 3G network. However, the UE needs to execute a CS handover (CS HO) during a continuation process of executing the voice service, and therefore the UE is handed over to another 2G network or 3G network. In this case, the UE displays a corresponding network name according to a PLMN ID of a 2G network or 3G network that is used after the handover; or if the UE receives a GMM information message sent by an SGSN/MME in the 2G network or the 3G network, or if the UE receives an MM information message sent by an MSC/VLR in the 2G network or the 3G network, the UE displays a network name informed by the GMM information message or the MM information message. In this case, a network name displayed on the UE when the UE triggers the CS domain voice service may be inconsistent with a network name displayed on the UE when the UE is handed over to the another 2G network or 3G network.

Figure 3:
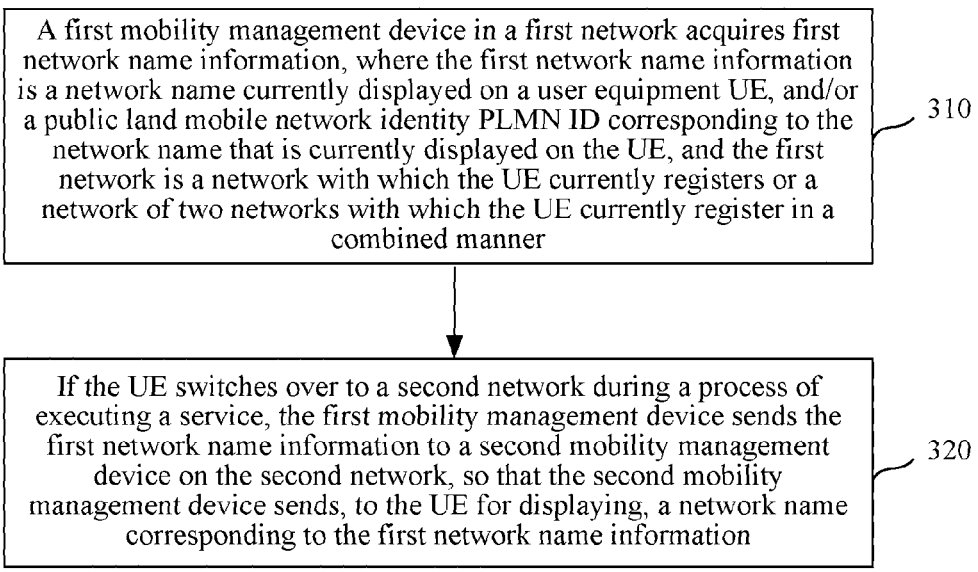
FIG. 3 is a flowchart of a method for displaying a network name according to another embodiment of the present invention.

To resolve the foregoing problem, another embodiment of the present invention provides a method for displaying a network name. It should be noted that the method in this embodiment may be executed after step 230 in the foregoing embodiment, for example, as step 240, or may also be executed independent of the foregoing embodiment. As shown in FIG. 3, this embodiment includes the following steps:

Step 310: A first mobility management device in a first network acquires first network name information, where the first network name information is a network name currently displayed on a user equipment UE, and/or a public land mobile network identity PLMN ID corresponding to the network name that is currently displayed on the UE, and the first network is a network with which the UE currently registers or a network of two networks with which the UE currently register in a combined manner.

Step 320: If the UE switches over to a second network during a process of executing a service, the first mobility management device sends the first network name information to a second mobility management device in the second network, so that the second mobility management device sends, to the UE for displaying, a network name corresponding to the first network name information.

In this embodiment, the first mobility management device sends information of the network name currently displayed on the UE to the second mobility management device in the second network, and the second mobility management device in the second network sends the information of the network name to the UE for displaying. In this way, the network name displayed on the UE is the same as a previously displayed network name.

Figure 4:
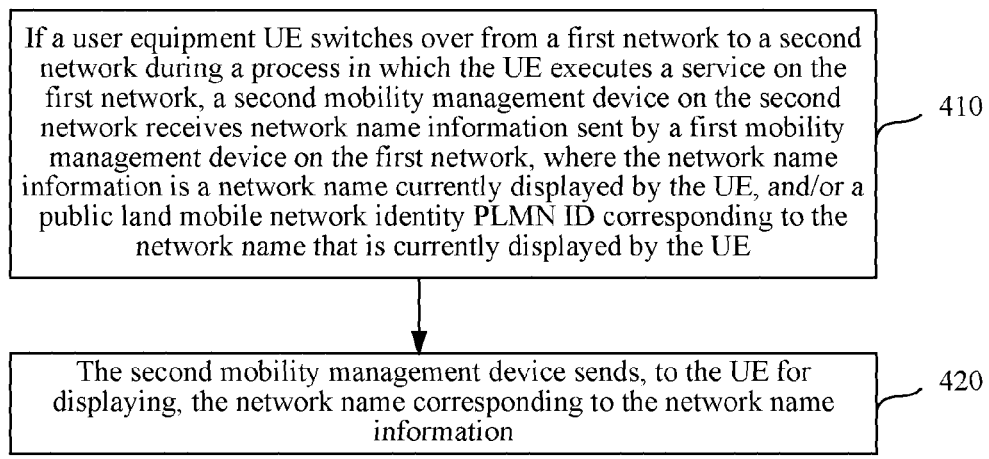
FIG. 4 is a flowchart of a method for displaying a network name according to another embodiment of the present invention.

Correspondingly, to resolve the foregoing problem, another embodiment of the present invention provides a method for displaying a network name, and the method is a method executed by a second mobility management device in a second network. As shown in FIG. 4, this embodiment includes the following steps:

Step 410: If a user equipment UE switches over from a first network to the second network during a process in which the UE executes a service in the first network, the second mobility management device in the second network receives network name information sent by a first mobility management device in the first network, where the network name information is a network name currently displayed on the UE, and/or a public land mobile network identity PLMN ID corresponding to the network name that is currently displayed on the UE.

Step 420: The second mobility management device sends, to the UE for displaying, the network name corresponding to the network name information.

In this embodiment, the first mobility management device sends information of the network name currently displayed on the UE to the second mobility management device in the second network, and the second mobility management device in the second network sends the information of the network name to the UE for displaying. In this way, the network name displayed on the UE is the same as a previously displayed network name.

Figure 5:
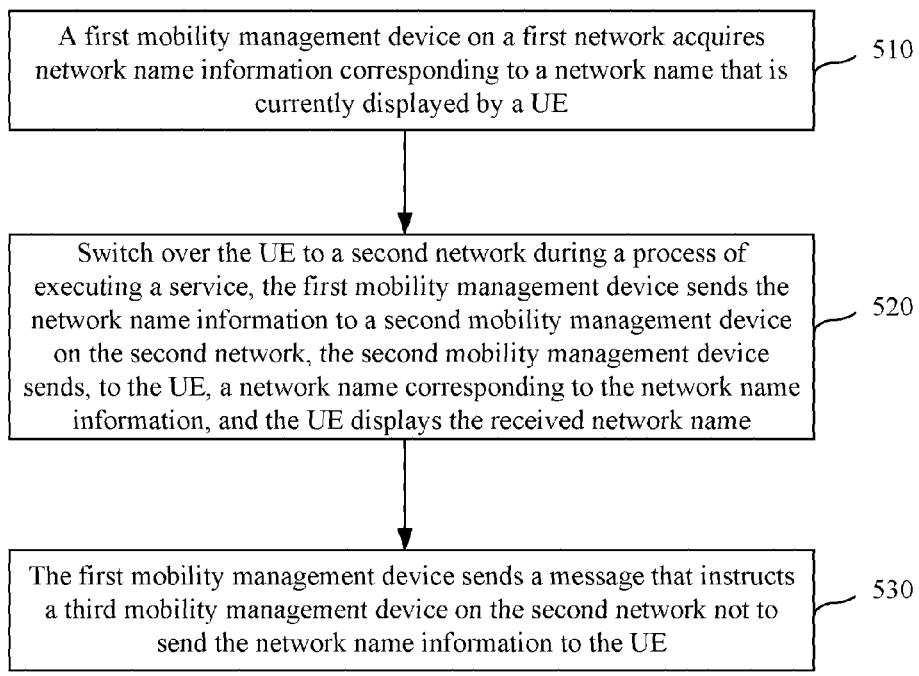
FIG. 5 is a flowchart of a method for displaying a network name according to another embodiment of the present invention.

Correspondingly, to resolve the foregoing problem, another embodiment of the present invention provides a method for displaying a network name. As shown in FIG. 5, this embodiment includes the following steps:

Step 510: A first mobility management device in a first network acquires network name information corresponding to a network name that is currently displayed on a UE.

The network name information is the network name currently displayed on the UE, and/or a PLMN ID corresponding to the network name that is currently displayed on the UE, and the first network is a network with which the UE currently registers. The UE may register with two networks at the same time, for example, register, by using a combined attach procedure, with two networks, for example, a 2G or 3G network and an LTE network.

The first mobility management device may acquire, in multiple manners, the network name information corresponding to the network name that is currently displayed on the UE.

For example, after the UE successfully registers with a network, the UE displays a network name of the registered network. The network name displayed on the UE may be displayed according to network name information sent by a mobility management device, as described in the method introduced in the foregoing embodiment or the background. In this case, during a process in which the UE successfully registers with the first network, the first mobility management device sends network network information to the UE. Therefore, the first mobility management device can acquire the network name corresponding to the network name information that is sent by the first mobility management device.

Alternatively, the UE may also display the network name according to a pre-configuration. In this case, to keep consistency between network name information, which is displayed on the UE and recorded by the first mobility management device, and a network name actually displayed on the UE, the first mobility management device has a configuration that is the same as that on the UE side. Therefore, the first mobility management device can acquire, according to this configuration, the PLMN identity corresponding to the network name that is displayed on the UE.

The UE displays the network name according to the configuration of the UE, and the configuration has multiple implementation manners. For example, the configuration may be: the UE displays a network name corresponding to a PLMN identity of a registered network, or the UE displays a network name corresponding to a predetermined PLMN identity among multiple acquired PLMN identities, or the like. However, regardless of configurations, a same configuration exists on the mobility management device.

It should be noted that for a different network, the first mobility management device may be different. For example, the first mobility management device may be an MME, an SGSN, or an MSC server.

For example, the first mobility management device is an MME. After the UE executes a combined attach procedure or a combined tracking area update procedure, the UE receives a to-be-displayed network name that is sent by the MME by using EMM information, or a PLMN ID sent by using a combined attach accept message or a combined tracking area accept message, and displays a network name corresponding to the received PLMN ID or displays the received network name, where the PLMN identity is a PLMN identity (i.e., an LTE PLMN ID) of a PS network to which the MME belongs, or the PLMN identity is a PLMN identity (i.e., a CS PLMN ID) of a CS network registered by the MME by using an MSC server. The MME may determine, according to the PLMN identity sent to the UE, that the PLMN identity is the PLMN identity corresponding to the network name that is displayed on the UE. Alternatively, the MME does not send mobility management information to the UE, and the UE displays the network name according to the configuration of the UE. In this case, the MME also determines, according to the same configuration on the MME, the PLMN identity corresponding to the network name that is displayed on the UE. Alternatively, the MME may determine, according to the network name sent to the UE, the network name displayed on the UE.

For another example, the mobility management device is an SGSN or an MSC server. The SGSN or the MSC server carries, according to a registered PLMN identity, the network name information in a GMM information message or MM Information message and sends the network name information to the UE. The UE displays the received network name to a user. The PLMN identity is a PLMN identity registered by the SGSN or the MSC server. Alternatively, the SGSN or the MSC server may determine, according to the network name sent to the UE, the network name displayed on the UE.

Certainly, the mobility management device may also acquire the network name information in another manner, for example, by means of interaction with the UE. Any method that can acquire the network name information may apply to this embodiment of the present invention.

Step 520: Switch over the UE to a second network during a process of executing a service, the first mobility management device sends the network name information to a second mobility management device in the second network, the second mobility management device sends, to the UE, a network name corresponding to the network name information, and the UE displays the received network name.

Specifically, the UE falls back to the second network during a process of executing a CSFB service, the first mobility management device sends the network name information to the second mobility management device, the second mobility management device sends, to the UE, the network name corresponding to the network name information, and the UE displays the received network name. In this case, the first network is an LTE network, and the second network is a CS domain network. If the UE attaches to a third network in a combined manner when attaching to the LTE, the second network may be the same as or may be different from the third network.

Alternatively, the UE is handed over to the second network during a process of executing a voice service, the first mobility management device sends the network name information to the second mobility management device, the second mobility management device sends, to the UE, the network name corresponding to the network name information, and the UE displays the received network name. In this case, the first network and the second network may be one of: an LTE network, a 2G network, and a 3G network, and the first network is different from the second network. If the UE attaches to a third network in a combined manner when attaching to the first network, the second network may be the same as or may be different from the third network.

For example, if the first network is an LTE network, the second network is a 2G network or a 3G network. After the UE is handed over or falls back from the first network to the second network, an MSC server or an SGSN in the second network sends mobility management information (for example, MM Information or GMM Information) to the UE, and the UE displays the received network name, where the mobility management information carries the network name, so that the UE still keeps the displayed network name unchanged but does not display a network name of a network after the handover or fallback.

The second mobility management device may acquire the corresponding network name according to the network name information and then send the corresponding network name to the UE. For example:

If the network name information is the network name currently displayed on the UE, the second mobility management device directly acquires the network name according to the network name information, and sends the network name to the UE.

If first network name information is the PLMN ID corresponding to the network name that is currently displayed on the UE, the second mobility management device may acquire, according to the PLMN ID, the network name corresponding to the PLMN ID, and send the network name to the UE. A correspondence between each PLMN ID and a network name is prestored in the second mobility management device. Certainly, the correspondence may also be acquired in another manner.

Alternatively, if first network name information is the network name currently displayed on the UE, and the PLMN ID corresponding to the network name that is currently displayed on the UE, the second mobility management device may also directly acquire the network name according to the network name information, and send the network name to the UE.

Optionally, the first mobility management device sends the network name information to the second mobility management device in multiple manners. For example, the first mobility management device sends a request message to the second mobility management device, where the request message includes the network name information, and the request message includes but is not limited to a location update request message or a service request message.

In a first example, when the UE executes a CSFB service, the MME may carry the network name information in a location update request message that is sent to the MSC server.

In a second example, the UE serves as a called party of a CSFB voice service, and the MME may carry the network name information in a service request message that is sent to the MSC server; or the UE serves as a calling party of a CSFB voice service, and the MME may carry the network name information in a service request message or another request message that is sent to the MSC server.

In a third example, before the UE starts executing the CSFB service, a first MSC server serves the UE, where the first MSC server is a mobility management device corresponding to a first 2G or first 3G network, and the first 2G or first 3G network is a CS domain network of networks with which the UE jointly register. When the UE serves as a called party or a calling party of a CSFB voice service, the UE falls back to a second MSC server, and in a second 2G or second 3G network, the second MSC server serves the UE. If the first MSC server is different from the second MSC server, the second MSC server needs to acquire the first network name information from the first MSC server. In this case, the second MSC server acquires the network name information from a first MSC/VLR by using a "send identification message."

It should be specially noted that, this embodiment of the present invention is not limited to a CSFB voice service and also applies to all CSFB services, where the CSFB service includes one of: a CSFB voice service, a CSFB location (LCS) service, a CSFB call independent supplementary (CISS) service, and a CSFB short message service. Other CSFB services are the same as the CSFB voice service, and details are not described again in this specification.

In a fourth example, when the UE performs a Voice over Internet Protocol (VoIP) service in the LTE network, if the VoIP service is switched from the LTE network to another PS domain network, for example, a high speed uplink packet access (HSUPA) network, the MME carries the network name information in a handover message that is sent to the SGSN.

In a fifth example, when the UE performs a VoIP voice service in the 3G network (for example, a HSUPA network), a packet switched (PS) handover (HO) is executed to hand over the UE to the LTE. During a handover process, the SGSN carries the network name information in a handover message that is sent to the MME.

In a sixth example, when the UE performs a VoIP voice service in the LTE network, single radio voice call continuity (SRVCC) is executed to hand over the UE to a 2G or 3G CS domain, and the SGSN or the MME may carry the network name information in a PS to CS handover message that is sent to the MSC server.

In a seventh example, when the UE executes a CS voice service in the 2G or 3G network, and during a continuation process of executing the voice service, reverse single radio voice call continuity (SRVCC) needs to be executed to hand over the UE to the LTE network or the HSPA network, the MSC server carries the network name information in a CS to PS handover message that is sent to the SGSN or the MME.

In an eighth example, when the UE executes a CS voice service in the 2G or 3G network, and during a continuation process of executing the voice service, a circuit switched handover is executed to hand over the UE to another 2G or 3G network, the MSC server carries the network name information in a CS to CS handover message that is sent to the MSC server.

It should be noted that in the foregoing examples, the network name information may be carried in a newly added information element in the foregoing messages, and the newly added information element is specially used to store the network name information.

It should be noted that the foregoing first mobility management device and second mobility management device may include but are not limited to an MSC/VLR, i.e., an MSC server, a serving GPRS support node (SGSN), or an MME, where the MSC server may be an MSC server of SRVCC, may also be an MSC server of rSRVCC, and may further be an MSC server of CSFB.

In addition, if the second network is a pure PS domain network, for example, an LTE network, the method in this embodiment ends, and the first mobility management device is a mobility management device in the pure PS domain network; and if the second network is a network such as a 2G or 3G network in which a CS domain coexists with a PS domain, the first mobility management device may be a mobility management device in a PS domain network and may also be a mobility management device in a CS domain network, and the method in this embodiment further includes step 530.

In this embodiment, network name information is sent to a network device in a network to which a UE switches over, so that the network device can send the network name information to the UE, thereby keeping consistency between a network name displayed on the UE and a network name displayed before the switchover, and improving user experience.

Step 530: The first mobility management device instructs a third mobility management device in the second network not to send the network name information to the UE.

The first mobility management device may instruct, by sending a request message, the third mobility management device in the second network not to send, to the UE, the network name and/or the PLMN ID corresponding to the network name, where the request message includes indication information, which is used to instruct the second mobility management device not to send the network name and/or the PLMN ID corresponding to the network name, and specifically the indication information may instruct the second mobility management device in the second network not to send a mobility management information message.

The request message includes but is not limited to a location update request message, a service request message, a handover request message (e.g., forward relocation request message), a context response message, a context request message, a location update request message or a service request message.

In a first example, when the UE executes a CSFB service, the MME may carry the indication information in a location update request message (location update request) that is sent to the MSC server.

In a second example, the UE serves as a called party of a CSFB voice service, and the MME may carry the indication information in a service request that is sent to the MSC server. Alternatively, when the UE servers as a calling party of a CSFB voice service, the MME may carry the indication information in a service request or another request message that is sent to the MSC server.

In a third example, when the UE servers as a calling party of a CSFB voice service and executes a location update process, during a process in which the SGSN acquires a UE context from the MME, the MME may carry the indication information in a context request that is sent to the SGSN.

In a fourth example, before the UE starts executing the CSFB service, the first MSC server serves the UE, where the first MSC server is a mobility management device corresponding to the first 2G or first 3G network, and the first 2G or first 3G network is a CS domain network of networks with which the UE jointly register. When the UE servers as a called party or a calling party of a CSFB voice service, if the first MSC server is different from the second MSC server, the first MSC server sends the indication information to the second MSC server by using a "send identification" message.

In a fifth example, when the UE performs a VoIP voice service in the LTE network, and SRVCC is executed to hand over the UE to the 2G or 3G CS domain, the SGSN or the MME carries the indication information in a PS to CS handover message that is sent to the MSC server.

In a sixth example, when the service is a voice service, the MME or the SGSN carries the indication information in a handover message that is sent to the MSC server.

In a seventh example, when the service is a voice service, the MME carries the indication information in a PS to CS handover message that is sent to the MSC server.

It should be noted that in the foregoing examples, the indication information may be carried in a newly added information element in the foregoing messages, and the newly added information element is specially used to store the indication information.

In addition, if the second mobility management device is a mobility management device in the PS domain network, the third mobility management device is a mobility management device in the CS domain network; and if the second mobility management device is a mobility management device in the CS domain network, the third mobility management device is a mobility management device in the PS domain network.

In this embodiment, network name information is sent to a corresponding mobility management device in a CS domain or a PS domain of a 2G or 3G network to which a UE switches over, and indication information is sent to another corresponding mobility management device in the CS domain or the PS domain, so that the UE can acquire name information sent by only one mobility management device, thereby keeping consistency between a network name displayed on the UE and a network name displayed before the switchover, and improving user experience.

Figure 6:
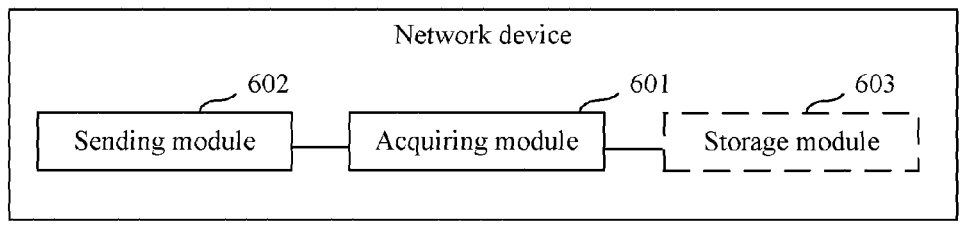
FIG. 6 is a schematic structural diagram of a network device according to an embodiment of the present invention.

Based on the methods provided in the foregoing embodiments, an embodiment further provides a network device, where the network device can execute the method for displaying a network name in the foregoing first embodiment of the present invention. In this embodiment, only a structure of the network device is simply described. For a specific principle, refer to the descriptions in the method embodiments. As shown in FIG. 6, the network device includes an acquiring module 601 and a sending module 602.

The acquiring module 601 is configured to acquire first network name information, where the first network name information is a network name currently displayed on a user equipment UE, and/or a public land mobile network identity PLMN ID corresponding to the network name that is currently displayed on the UE, and the first network is a network with which the UE currently registers or a network of two networks with which the UE currently jointly register.

The sending module 602 is configured to: if the UE switches over to a second network during a process of executing a service, send the first network name information acquired by the acquiring module 601 to a second mobility management device in the second network, so that the second mobility management device sends, to the UE for displaying, a network name corresponding to the first network name information.

Because the methods in the foregoing embodiments can be executed in this embodiment, for a technical effect that can be achieved in this embodiment, refer to the descriptions in the foregoing embodiments, and details are not described herein again.

Further, if the second network is a 2G network, the sending module 602 is further configured to: after the sending the first network name information to a second mobility management device in the second network, instruct a third mobility management device in the second network not to send second network name information to the UE, where the second network name information is any network name and/or a PLMN ID corresponding to the any network name, the third mobility management device is a mobility management device of a circuit switched domain in the 2G, and the second mobility management device is a mobility management device of a packet switched domain in the 2G network; or, the third mobility management device is a mobility management device of the packet switched domain in the 2G network, and the second mobility management device is a mobility management device of the circuit switched domain in the 2G network.

Alternatively, if the second network is a 3G network, the sending module 602 is further configured to: after the sending the first network name information to a second mobility management device in the second network, instruct a third mobility management device in the second network not to send second network name information to the UE, where the second network name information is any network name and/or a PLMN ID corresponding to the any network name, the third mobility management device is a mobility management device of a circuit switched domain in the 3G, and the second mobility management device is a mobility management device of a packet switched domain in the 3G network; or, the third mobility management device is a mobility management device of the packet switched domain in the 3G network, and the second mobility management device is a mobility management device of the circuit switched domain in the 3G network.

Further, the sending module 602 is specifically configured to instruct, in the following manner, the third mobility management device in the second network not to send the second network name information to the UE: instructing, by using a request message, the third mobility management device not to send the second network name information to the UE, where the request message includes indication information, and the indication information is used to instruct the third mobility management device not to send the second network name information to the UE.

The sending module 602 is specifically configured to send the request message that carries the indication information, where the indication information is specifically used to instruct the third mobility management device not to send, to the UE, a universal mobile telecommunications system terrestrial radio access network E-UTRAN mobility management information EMM information message, or a general packet radio service GPRS mobility management information GMM information message or mobility management information MM information message.

Further, if the service is a CSFB service, the sending module 602 is specifically configured to send, in the following manner, the first network name information to the second mobility management device:

sending the first network name information to the second mobility management device by using an update request message or a service request message, where the first mobility management device is a first MME, and the second mobility management device is a first MSC server; or sending the first network name information to the second mobility management device by using a send identification message, where the first mobility management device is a first MSC server, and the second mobility management device is a second MSC server.

If the service is a voice service, the sending module 602 is specifically configured to send, in the following manner, the first network name information to the second mobility management device:

sending the first network name information to the second mobility management device by using a handover message, where the first network is a first packet switched domain network, and the second network is a second packet switched domain network; or sending the first network name information to the second mobility management device by using a packet switched to circuit switched PS to CS handover message, where the first network is a first packet switched domain network, and the second network is a second circuit switched domain network; or sending the first network name information to the second mobility management device by using a circuit switched to packet switched CS to PS handover message, where the first network is a first circuit switched domain network, and the second network is a second packet switched domain network; or sending the first network name information to the second mobility management device by using a circuit switched to circuit switched CS to CS handover message, where the first network is a first circuit switched domain network, and the second network is a second circuit switched domain network.

Further, if the service is a circuit switched fallback CSFB service, the sending module 602 is specifically configured to instruct, in the following manner and by using a request message, the third mobility management device not to send the second network name information to the UE:

instructing, by using a location update request message or a service request message, the third mobility management device not to send the second network name information to the UE, where the request message is the location update request message or the service request message, the first network is a Long Term Evolution network, the first mobility management device is a first MME, the second mobility management device is a second SGSN, and the third mobility management device is a second MSC server; or instructing, by using a context request message or a handover request message, the third mobility management device not to send the second network name information to the UE, where the request message is the context request message or the handover request message, the first mobility management device is a first MME, the second mobility management device is a second MSC server, and the third mobility management device is a second SGSN; or if the service is a voice service, the sending module 602 is specifically configured to instruct, in the following manner and by using a request message, the third mobility management device not to send the second network name information to the UE:

instructing, by sending a handover message, the third mobility management device not to send the second network name information to the UE, where the request message is the handover message, the first mobility management device is a first MME, the second mobility management device is a second SGSN, and the third mobility management device is a second MSC server; or instructing, by sending a handover message, the third mobility management device not to send the second network name information to the UE, where the request message is the handover message, the first mobility management device is a first SGSN, the second mobility management device is a second MME, and the third mobility management device is a second MSC server; or instructing, by sending a packet switched to circuit switched PS to CS handover message, the third mobility management device not to send the second network name information to the UE, where the request message is the PS to CS handover message, the first mobility management device is a first MME, the second mobility management device is a second MSC server, and the third mobility management device is a second MME; or instructing, by sending a PS to CS handover message, the third mobility management device not to send the second network name information to the UE, where the request message is the PS to CS handover message, the first mobility management device is a first MME, the second mobility management device is a second SGSN, and the third mobility management device is a second MSC server.

In addition, the network device may further include a storage module 603.

The storage module 603 is configured to store a first configuration, where the first configuration is a predetermined network name and/or a PLMN ID corresponding to the predetermined network name, the first configuration is the same as a second configuration of the UE, and the UE displays a network name according to the second configuration of the UE; and the acquiring module 601 is specifically configured to acquire the first network name information in the following manner: acquiring the first network name information corresponding to the first configuration that is stored by the storage module; or the sending module 602 is further configured to send, to the UE, the network name currently displayed on the UE; and the storage module 603 is configured to store the network name sent by the sending module 602, where the acquiring module is configured to acquire the first network name information in the following manner: acquiring the first network name information corresponding to the network name that is stored by the storage module 603.

The network device in this embodiment can execute the methods in the foregoing embodiments. For details, refer to the descriptions in the foregoing embodiments. In addition, a technical effect that can be achieved by the network device is the same as that in the foregoing embodiments, and details are not described herein again.

In addition, an embodiment of the present invention further provides a communications system, where the communications system includes the two network devices in the foregoing embodiments. For specific structures and functions of the network devices, refer to the foregoing embodiments, and details are not described herein again.

Figure 7:
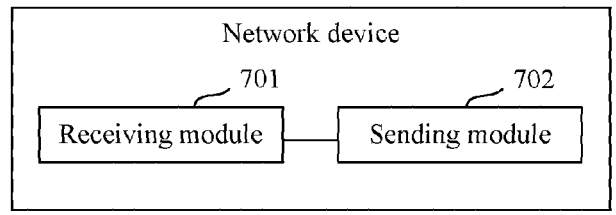
FIG. 7 is a schematic structural diagram of a network device according to another embodiment of the present invention.

Based on the methods provided in the foregoing embodiments, an embodiment further provides a network device, where the network device can execute the methods in the embodiments of the present invention. In this embodiment, only a structure of the network device is simply described. For a specific principle, refer to the descriptions in the method embodiments. As shown in FIG. 7, the network device includes a receiving module 701 and a sending module 702.

The receiving module 701 is configured to: if a user equipment UE switches over from a first network to a second network during a process of executing a service in the first network, receive network name information sent by a first mobility management device in the first network, where the network name information is a network name currently displayed on the UE, and/or a public land mobile network identity PLMN ID corresponding to the network name that is currently displayed on the UE.

The sending module 702 is configured to send, to the UE for displaying, the network name corresponding to the network name information that is received by the receiving module 701.

If the service is a circuit switched fallback CSFB service, the receiving module 701 is specifically configured to receive, in the following manner, the network name information sent by the first mobility management device:

receiving, by using an update request message or a service request message, the network name information sent by the first mobility management device, where the first mobility management device is a mobility management entity MME, and the second mobility management device is a mobile switching center server second MSC server; or receiving, by using a send identification message, the network name information sent by the first mobility management device, where the first mobility management device is a first MSC server, and the second mobility management device is a second MSC server.

The service is a voice service.

The receiving module 701 is specifically configured to receive, in the following manner, the network name information sent by the first mobility management device:

receiving, by using a handover message, the network name information sent by the first mobility management device, where the first network is a first packet switched domain network, and the second network is a second packet switched domain network; or receiving, by using a packet switched to circuit switched PS to CS handover message, the network name information sent by the first mobility management device, where the first network is a first packet switched domain network, and the second network is a second circuit switched domain network; or receiving, by using a circuit switched to packet switched CS to PS handover message, the network name information sent by the first mobility management device, where the first network is a first circuit switched domain network, and the second network is a second packet switched domain network; or receiving, by using a circuit switched to circuit switched CS to CS handover message, the network name information sent by the first mobility management device, where the first network is a first circuit switched domain network, and the second network is a second circuit switched domain network.

The network device in this embodiment can execute the methods in the foregoing embodiments. For details, refer to the descriptions in the foregoing embodiments. In addition, a technical effect that can be achieved by the network device is the same as that in the foregoing embodiments, and details are not described herein again.

Figure 8:
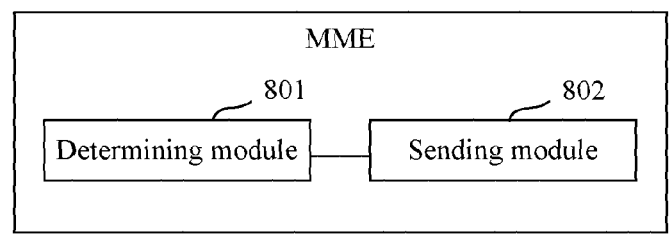
FIG. 8 is a schematic structural diagram of an MME according to an embodiment of the present invention.

Based on the methods provided in the foregoing embodiments, an embodiment further provides an MME. The MME is an MME in a first network, which can execute the methods in the foregoing embodiments of the present invention. In this embodiment, only a structure of the MME is simply described. For a specific principle, refer to the descriptions in the foregoing method embodiments. As shown in FIG. 8, the MME includes a determining module 801 and a sending module 802.

The determining module 801 is configured to determine, during a process of a combined attach procedure or a combined tracking area update procedure, whether an operator to which a public land mobile network identity PLMN ID corresponding to the first network belongs is the same as an operator to which a PLMN ID corresponding to a second network belongs; and if the operator to which the public land mobile network identity PLMN ID corresponding to the first network belongs is different from the operator to which the PLMN ID corresponding to the second network belongs, instruct the sending module 802 to send network name information.

The sending module 802 is configured to send the network name information to a user equipment UE, so that the UE displays a network name corresponding to the network name information, where the first network and the second network are networks with which the UE jointly register during the combined attach procedure or the combined tracking area update procedure, the first network is a Long Term Evolution LTE network, and the second network is a 2G network or a 3G network.

Further, the sending module 802 is specifically configured to send the network name information to the UE in the following manner: sending the network name information to the UE by using a universal mobile telecommunications system terrestrial radio access network E-UTRAN mobility management information EMM information message.

Further, the sending module 802 is further configured to: after the sending the network name information to a UE, if the UE switches over to the second network during a process of executing a service, send the network name information to a first mobility management device in the second network, so that the first mobility management device in the second network sends, to the UE for displaying, the network name corresponding to the network name information; or the sending module 802 is further configured to: after the sending the network name information to a UE, if the UE switches over to the second network during a process of executing a service, send the network name information to a second mobility management device in a third network, so that the second mobility management device in the third network sends, to the UE for displaying, the network name corresponding to the network name information.

The MME in this embodiment can execute the methods in the foregoing embodiments. For details, refer to the descriptions in the foregoing embodiments. In addition, a technical effect that can be achieved by the MME is the same as that in the foregoing embodiments, and details are not described herein again.

Figure 9:
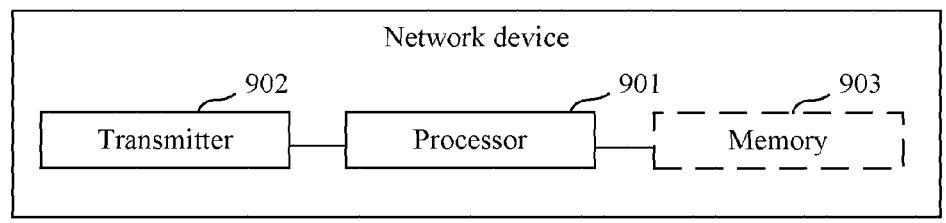
FIG. 9 is a schematic structural diagram of a network device according to another embodiment of the present invention.

Another embodiment of the present invention further provides a network device, where the network device is a first mobility management device in a first network. The network device can execute the methods for displaying a network name in the foregoing embodiments of the present invention. In this embodiment, only a structure of the network device is simply described. For a specific principle, refer to the descriptions in the foregoing method embodiments. As shown in FIG. 9, the network device includes a processor 901 and a transmitter 902.

The processor 901 is configured to acquire first network name information, where the first network name information is a network name currently displayed on a user equipment UE, and/or a public land mobile network identity PLMN ID corresponding to the network name that is currently displayed on the UE, and the first network is a network with which the UE currently registers or a network of two networks with which the UE currently jointly register.

The transmitter 902 is configured to: if the UE switches over to a second network during a process of executing a service, send the first network name information acquired by the processor 901 to a second mobility management device in the second network, so that the second mobility management device sends, to the UE for displaying, a network name corresponding to the first network name information.

The network device in this embodiment can execute the methods in the foregoing embodiments. For details, refer to the descriptions in the foregoing embodiments. In addition, a technical effect that can be achieved by the network device is the same as that in the foregoing embodiments, and details are not described herein again.

Further, if the second network is a 2G network, the transmitter 902 is further configured to: after the sending the first network name information to a second mobility management device in the second network, instruct a third mobility management device in the second network not to send second network name information to the UE, where the second network name information is any network name and/or a PLMN ID corresponding to the any network name, the third mobility management device is a mobility management device of a circuit switched domain in the 2G, and the second mobility management device is a mobility management device of a packet switched domain in the 2G network; or, the third mobility management device is a mobility management device of the packet switched domain in the 2G network, and the second mobility management device is a mobility management device of the circuit switched domain in the 2G network.

Alternatively, if the second network is a 3G network, the transmitter 902 is further configured to: after the sending the first network name information to a second mobility management device in the second network, instruct a third mobility management device in the second network not to send second network name information to the UE, where the second network name information is any network name and/or a PLMN ID corresponding to the any network name, the third mobility management device is a mobility management device of a circuit switched domain in the 3G, and the second mobility management device is a mobility management device of a packet switched domain in the 3G network; or, the third mobility management device is a mobility management device of the packet switched domain in the 3G network, and the second mobility management device is a mobility management device of the circuit switched domain in the 3G network.

Further, the transmitter 902 is specifically configured to instruct, in the following manner, the third mobility management device in the second network not to send the second network name information to the UE: instructing, by using a request message, the third mobility management device not to send the second network name information to the UE, where the request message includes indication information, and the indication information is used to instruct the third mobility management device not to send the second network name information to the UE.

Further, the transmitter 902 is specifically configured to send the request message that carries the indication information, where the indication information is specifically used to instruct the third mobility management device not to send, to the UE, a universal mobile telecommunications system terrestrial radio access network E-UTRAN mobility management information EMM information message, or a general packet radio service GPRS mobility management information GMM information message or mobility management information MM information message.

If the service is a circuit switched fallback CSFB service, the transmitter 902 is specifically configured to send, in the following manner, the first network name information to the second mobility management device:

sending the first network name information to the second mobility management device by using an update request message or a service request message, where the first mobility management device is a first MME, and the second mobility management device is a second MSC server; or sending the first network name information to the second mobility management device by using a send identification message, where the first mobility management device is a first MSC server, and the second mobility management device is a second MSC server.

If the service is a voice service, the transmitter 902 is specifically configured to send, in the following manner, the first network name information to the second mobility management device:

sending the first network name information to the second mobility management device by using a handover message, where the first network is a first packet switched domain network, and the second network is a second packet switched domain network; or sending the first network name information to the second mobility management device by using a packet switched to circuit switched PS to CS handover message, where the first network is a first packet switched domain network, and the second network is a second circuit switched domain network; or sending the first network name information to the second mobility management device by using a circuit switched to packet switched CS to PS handover message, where the first network is a first circuit switched domain network, and the second network is a second packet switched domain network; or sending the first network name information to the second mobility management device by using a circuit switched to circuit switched CS to CS handover message, where the first network is a first circuit switched domain network, and the second network is a second circuit switched domain network.

If the service is a circuit switched fallback CSFB service, the transmitter 902 is specifically configured to instruct, in the following manner and by using a request message, the third mobility management device not to send the second network name information to the UE:

instructing, by using a location update request message or a service request message, the third mobility management device not to send the second network name information to the UE, where the request message is the location update request message or the service request message, the first network is a Long Term Evolution network, the first mobility management device is a first MME, the second mobility management device is a second SGSN, and the third mobility management device is a second MSC server; or instructing, by using a context request message or a handover request message, the third mobility management device not to send the second network name information to the UE, where the request message is the context request message or the handover request message, the first mobility management device is a first MME, the second mobility management device is a second MSC server, and the third mobility management device is a second SGSN; or if the service is a voice service, the transmitter 902 is specifically configured to instruct, in the following manner and by using a request message, the third mobility management device not to send the second network name information to the UE:

instructing, by sending a handover message, the third mobility management device not to send the second network name information to the UE, where the request message is the handover message, the first mobility management device is a first MME, the second mobility management device is a second SGSN, and the third mobility management device is a second MSC server; or instructing, by sending a handover message, the third mobility management device not to send the second network name information to the UE, where the request message is the handover message, the first mobility management device is a first SGSN, the second mobility management device is a second MME, and the third mobility management device is a second MSC server; or instructing, by sending a packet switched to circuit switched PS to CS handover message, the third mobility management device not to send the second network name information to the UE, where the request message is the PS to CS handover message, the first mobility management device is a first MME, the second mobility management device is a second MSC server, and the third mobility management device is a second MME; or instructing, by sending a PS to CS handover message, the third mobility management device not to send the second network name information to the UE, where the request message is the PS to CS handover message, the first mobility management device is a first MME, the second mobility management device is a second SGSN, and the third mobility management device is a second MSC server.

In addition, the network device further includes a memory 903.

The memory 903 is configured to store a first configuration, where the first configuration is a predetermined network name and/or a PLMN ID corresponding to the predetermined network name, the first configuration is the same as a second configuration of the UE, and the UE displays a network name according to the second configuration of the UE; and the processor 901 is specifically configured to acquire the first network name information in the following manner: acquiring the first network name information corresponding to the first configuration that is stored by the memory 903; or the transmitter 902 is further configured to send, to the UE, the network name currently displayed on the UE; and the memory is configured to store the network name sent by the transmitter, where the processor 901 is configured to acquire the first network name information in the following manner: acquiring the first network name information corresponding to the network name that is stored by the memory 903.

Figure 10:
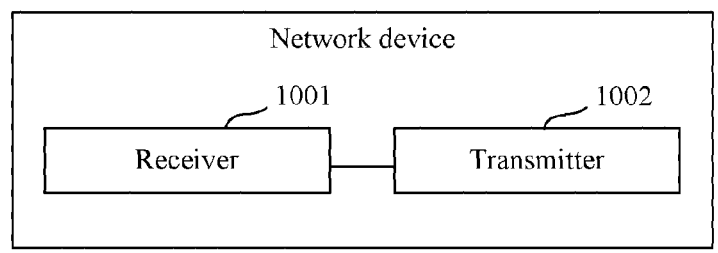
FIG. 10 is a schematic structural diagram of a network device according to another embodiment of the present invention.

Another embodiment of the present invention further provides a network device, where the network device is a second mobility management device in a second network. The network device can execute the methods for displaying a network name in the foregoing embodiments of the present invention. In this embodiment, only a structure of the network device is simply described. For a specific principle, refer to the descriptions in the foregoing method embodiments. As shown in FIG. 10, the network device includes a receiver 1001 and a transmitter 1002.

The receiver 1001 is configured to: if a user equipment UE switches over from a first network to the second network during a process of executing a service in the first network, receive network name information sent by a first mobility management device in the first network, where the network name information is a network name currently displayed on the UE, and/or a public land mobile network identity PLMN ID corresponding to the network name that is currently displayed on the UE.

The transmitter 1002 is configured to send, to the UE for displaying, the network name corresponding to the network name information that is received by the receiver 1001.

If the service is a circuit switched fallback CSFB service, the receiver 1001 is specifically configured to receive, in the following manner, the network name information sent by the first mobility management device:

receiving, by using an update request message or a service request message, the network name information sent by the first mobility management device, where the first mobility management device is a mobility management entity MME, and the second mobility management device is a mobile switching center server second MSC server; or receiving, by using a send identification message, the network name information sent by the first mobility management device, where the first mobility management device is a first MSC server, and the second mobility management device is a second MSC server.

If the service is a voice service, the receiver 1001 is specifically configured to receive, in the following manner, the network name information sent by the first mobility management device:

receiving, by using a handover message, the network name information sent by the first mobility management device, where the first network is a first packet switched domain network, and the second network is a second packet switched domain network; or receiving, by using a packet switched to circuit switched PS to CS handover message, the network name information sent by the first mobility management device, where the first network is a first packet switched domain network, and the second network is a second circuit switched domain network; or receiving, by using a circuit switched to packet switched CS to PS handover message, the network name information sent by the first mobility management device, where the first network is a first circuit switched domain network, and the second network is a second packet switched domain network; or receiving, by using a circuit switched to circuit switched CS to CS handover message, the network name information sent by the first mobility management device, where the first network is a first circuit switched domain network, and the second network is a second circuit switched domain network.

The network device in this embodiment can execute the methods in the foregoing embodiments. For details, refer to the descriptions in the foregoing embodiments. In addition, a technical effect that can be achieved by the network device is the same as that in the foregoing embodiments, and details are not described herein again.

In addition, an embodiment of the present invention further provides a communications system, where the communications system includes the two network devices in the foregoing embodiments. For specific structures and functions of the network devices, refer to the foregoing embodiments, and details are not described herein again.

Figure 11:
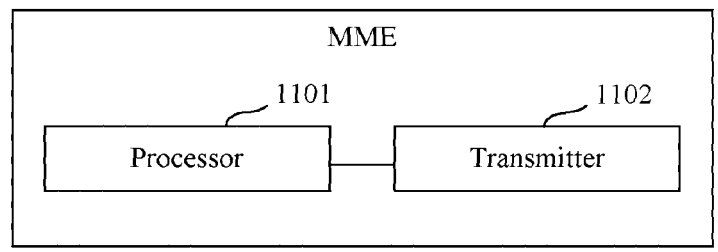
FIG. 11 is a schematic structural diagram of an MME according to another embodiment of the present invention.

Another embodiment of the present invention further provides an MME, where the MME is a first mobility management device in a first network. The MME can execute the methods for displaying a network name in the foregoing embodiments of the present invention. In this embodiment, only a structure of the MME is simply described. For a specific principle, refer to the descriptions in the foregoing method embodiments. As shown in FIG. 11, the MME includes a processor 1101 and a transmitter 1102.

The processor 1101 is configured to determine, during a process of a combined attach procedure or a combined tracking area update procedure, whether an operator to which a public land mobile network identity PLMN ID corresponding to the first network belongs is the same as an operator to which a PLMN ID corresponding to a second network belongs; and if different, instruct the transmitter 1102 to send network name information.

The transmitter 1102 is configured to send the network name information to a user equipment UE, so that the UE displays a network name corresponding to the network name information, where the first network and the second network are networks with which the UE jointly register during the combined attach procedure or the combined tracking area update procedure, the first network is a Long Term Evolution LTE network, and the second network is a 2G network or a 3G network.

Further, the transmitter 1102 is specifically configured to send the network name information to the UE in the following manner: sending the network name information to the UE by using a universal mobile telecommunications system terrestrial radio access network E-UTRAN mobility management information EMM information message.

Further, the transmitter 1102 is further configured to: after the sending the network name information to a UE, if the UE switches over to the second network during a process of executing a service, send the network name information to a first mobility management device in the second network, so that the first mobility management device in the second network sends, to the UE for displaying, the network name corresponding to the network name information; or the transmitter 1102 is further configured to: after the sending the network name information to a UE, if the UE switches over to the second network during a process of executing a service, send the network name information to a second mobility management device in a third network, so that the second mobility management device in the third network sends, to the UE for displaying, the network name corresponding to the network name information.

It should be noted that the network device and the MME provided in each of the foregoing embodiments of the present invention may further include, in addition to the foregoing modules, a radio frequency processor, a power controller, and another part, and the embodiments of the present invention are all not limited to including only the foregoing modules.

It should be noted that, in the foregoing embodiments of the network device and the MME, division of functional modules is only an example for description. In an actual application, the foregoing functions may be allocated to different functional modules for completion according to a requirement, for example, according to a corresponding hardware configuration requirement or for ease of software implementation. That is, internal structures of the user equipment and a bastion station are divided into different functional modules, to complete all or a part of functions described above.

A person of ordinary skill in the art may understand that all or a part of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

The foregoing introduces in detail the method, the user equipment, and the base station provided in the embodiments of the present invention. Specific examples are used in this specification to describe the principle and implementation manners of the present invention. The descriptions of the foregoing embodiments are merely intended to help understand the method and core idea of the present invention. In addition, with respect to the specific implementation manners and the application scope, modifications may be made by a person of ordinary skill in the art according to the idea of the present invention. Therefore, the content of this specification shall not be construed as a limitation on the present invention.

What is claimed is:

1. A method for displaying a network name, comprising:
acquiring, by a first mobility management device in a first network, first network name information, wherein the first network name information is a network name currently displayed on a user equipment (UE), and/or a public land mobile network identity (PLMN ID) corresponding to the network name that is currently displayed on the UE, and the first network is a network with which the UE currently registers or a network of two networks with which the UE currently jointly register; and if the UE switches over to a second network during a process of executing a service, sending, by the first mobility management device, the first network name information corresponding to a network name that will be displayed on the UE, to a second mobility management device in the second network, wherein:

the second network is a 2G network, after the sending the first network name information to a second mobility management device in the second network, the method further comprises: instructing, by the first mobility management device, a third mobility management device in the second network not to send second network name information to the UE, wherein the second network name information is any network name and/or a PLMN ID corresponding to the any network name, the third mobility management device is a mobility management device of a circuit switched domain in the 2G network, and the second mobility management device is a mobility management device of a packet switched domain in the 2G network; or, the third mobility management device is a mobility management device of the packet switched domain in the 2G network, and the second mobility management device is a mobility management device of the circuit switched domain in the 2G network; or the second network is a 3G network, after the sending the first network name information to a second mobility management device in the second network, the method further comprises: instructing, by the first mobility management device, a third mobility management device in the second network not to send second network name information to the UE, wherein the second network name information is any network name and/or a PLMN ID corresponding to the any network name, the third mobility management device is a mobility management device of a circuit switched domain in the 3G network, and the second mobility management device is a mobility management device of a packet switched domain in the 3G network; or, the third mobility management device is a mobility management device of the packet switched domain in the 3G network, and the second mobility management device is a mobility management device of the circuit switched domain in the 3G network.

2. The method according to claim 1, the instructing, by the first mobility management device, a third mobility management device in the second network not to send second network name information to the UE comprises:
   instructing, by the first mobility management device by using a request message, the third mobility management device not to send the second network name information to the UE, wherein the request message comprises indication information, and the indication information is used to instruct the third mobility management device not to send the second network name information to the UE.

3. The method according to claim 2, wherein:
   the service is a CSFB service, the request message is a location update request message or a service request message, the first network is a Long Term Evolution network, the first mobility management device is a first mobility management entity (MME), the second mobility management device is a second serving GPRS support node (SGSN), and the third mobility management device is a second mobile switching center server MSC server; or
   the service is a CSFB service, the request message is a context request message or a handover request message, the first mobility management device is a first MME, the second mobility management device is a second MSC server, and the third mobility management device is a second SGSN; or
   the service is a voice service, the request message is a handover message, the first mobility management device is a first MME, the second mobility management device is a second SGSN, and the third mobility management device is a second MSC server; or
   the service is a voice service, the request message is a handover message, the first mobility management device is a first SGSN, the second mobility management device is a second MME, and the third mobility management device is a second MSC server; or
   the service is a voice service, the request message is a packet switched to circuit switched PS to CS handover message, the first mobility management device is a first MME, the second mobility management device is a second MSC server, and the third mobility management device is a second MME; or
   the service is a voice service, the request message is a PS to CS handover message, the first mobility management device is a first MME, the second mobility management device is a second SGSN, and the third mobility management device is a second MSC server.

4. The method according to claim 1, wherein:
   that the UE switches over to a second network during a process of executing a service comprises:
   executing a circuit switched fallback (CSFB) service to enable the UE to fall back from the first network to the second network.

5. The method according to claim 1, wherein:
   the acquiring, by a first mobility management device in a first network, first network name information comprises: acquiring, by the first mobility management device, the first network name information by using a first configuration, wherein the first configuration is a predetermined network name and/or a PLMN ID corresponding to the predetermined network name, the first configuration is the same as a second configuration of the UE, and the UE displays a network name according to the second configuration of the UE; or
   before the acquiring, by a first mobility management device in a first network, first network name information, the method further comprises: sending, by the first mobility management device, to the UE, the network name currently displayed on the UE; and the acquiring, by a first mobility management device, first network name information comprises: acquiring, by the first mobility management device, the first network name information corresponding to the network name that is sent by the first mobility management device.

6. A network device including a first mobility management device in a first network and comprising:
   a processor, configured to acquire first network name information, wherein the first network name information is a network name currently displayed on a user equipment (UE), and/or a public land mobile network identity (PLMN ID) corresponding to the network name that is currently displayed on the UE, and the first network is a network with which the UE currently registers or a network of two networks with which the UE currently jointly register; and
   a transmitter, configured to: if the UE switches over to a second network during a process of executing a service, send the first network name information that corresponds to a network name being displayed on the UE and is acquired by the processor to a second mobility management device in the second network, wherein:
   the second network is a 2G network, the transmitter is further configured to: after the sending the first network name information to a second mobility management device in the second network, instruct a third mobility management device in the second network not to send second network name information to the UE, wherein the second network name information is any network name and/or a PLMN ID corresponding to the any network name, the third mobility management device is a mobility management device of a circuit switched domain in the 2G network, and the second mobility management device is a mobility management device of a packet switched domain in the 2G network; or, the third mobility management device is a mobility management device of the packet switched domain in the 2G network, and the second mobility management device is a mobility management device of the circuit switched domain in the 2G network; or
   the second network is a 3G network, the transmitter is further configured to: after the sending the first network name information to a second mobility management device in the second network, instruct a third mobility management device in the second network not to send second network name information to the UE, wherein the second network name information is any network name and/or a PLMN ID corresponding to the any network name, the third mobility management device is a mobility management device of a circuit switched domain in the 3G network, and the second mobility management device is a mobility management device of a packet switched domain in the 3G network; or, the third mobility management device is a mobility management device of the packet switched domain in the 3G network, and the second mobility management device is a mobility management device of the circuit switched domain in the 3G network.

7. The network device according to claim 6, wherein the transmitter is configured to instruct, in the following manner, the third mobility management device in the second network not to send the second network name information to the UE:

instructing, by using a request message, the third mobility management device not to send the second network name information to the UE, wherein the request message comprises indication information, and the indication information is used to instruct the third mobility management device not to send the second network name information to the UE.

8. The network device according to claim 7, wherein the transmitter is configured to send the request message that carries the indication information, wherein the indication information is used to instruct the third mobility management device not to send, to the UE, a evolved universal mobile telecommunications system terrestrial radio access network (E-UTRAN) mobility management information (EMM) information message, or a general packet radio service (GPRS) mobility management information (GMM) information message or mobility management information MM information message.

9. The network device according to claim 7, wherein:
the service is a CSFB service, the request message is a location update request message or a service request message, the first network is a Long Term Evolution network, the first mobility management device is a first mobility management entity (MME), the second mobility management device is a second serving GPRS support node (SGSN), and the third mobility management device is a second mobile switching center server MSC server; or
the service is a CSFB service, the request message is a context request message or a handover request message, the first mobility management device is a first MME, the second mobility management device is a second MSC server, and the third mobility management device is a second SGSN; or
the service is a voice service, the request message is a handover message, the first mobility management device is a first MME, the second mobility management device is a second SGSN, and the third mobility management device is a second MSC server; or
the service is a voice service, the request message is a handover message, the first mobility management device is a first SGSN, the second mobility management device is a second MME, and the third mobility management device is a second MSC server; or
the service is a voice service, the request message is a packet switched to circuit switched PS to CS handover message, the first mobility management device is a first MME, the second mobility management device is a second MSC server, and the third mobility management device is a second MME; or
the service is a voice service, the request message is a PS to CS handover message, the first mobility management device is a first MME, the second mobility management device is a second SGSN, and the third mobility management device is a second MSC server.

10. The network device according to claim 6, wherein the network device further comprises a memory; wherein:
the memory is configured to store a first configuration, wherein the first configuration is a predetermined network name and/or a PLMN ID corresponding to the predetermined network name, the first configuration is the same as a second configuration of the UE, and the UE displays a network name according to the second configuration of the UE; and the processor is configured to acquire the first network name information in the following manner: acquiring the first network name information corresponding to the first configuration that is stored by the memory; or
the transmitter is further configured to send, to the UE, the network name currently displayed on the UE; and the memory is configured to store the network name sent by the transmitter, wherein the processor is configured to acquire the first network name information in the following manner: acquiring the first network name information corresponding to the network name that is stored by the memory.

* * * * *